United States Patent
Cho et al.

(10) Patent No.: US 10,716,196 B2
(45) Date of Patent: Jul. 14, 2020

(54) CONTACTOR

(71) Applicant: MODA-INNOCHIPS CO., LTD., Ansan-Si, Gyeonggi-Do (KR)

(72) Inventors: Seung Hun Cho, Siheung-Si (KR); Sung Jin Heo, Ansan-si (KR); Dong Suk Lee, Incheon (KR)

(73) Assignee: MODA-INNOCHIPS CO., LTD. (KR)

( * ) Notice: Subject to any disclaimer, the term of this patent is extended or adjusted under 35 U.S.C. 154(b) by 159 days.

(21) Appl. No.: 16/093,964

(22) PCT Filed: May 25, 2017

(86) PCT No.: PCT/KR2017/005483
§ 371 (c)(1),
(2) Date: Oct. 15, 2018

(87) PCT Pub. No.: WO2017/209448
PCT Pub. Date: Dec. 7, 2017

(65) Prior Publication Data
US 2019/0141825 A1    May 9, 2019

(30) Foreign Application Priority Data
May 30, 2016    (KR) .................. 10-2016-0066602

(51) Int. Cl.
*H05F 3/04* (2006.01)
*H01C 7/10* (2006.01)
(Continued)

(52) U.S. Cl.
CPC .............. *H05F 3/04* (2013.01); *H01C 7/10* (2013.01); *H01C 7/18* (2013.01); *H01G 2/14* (2013.01);
(Continued)

(58) Field of Classification Search
CPC combination set(s) only.
See application file for complete search history.

(56) References Cited

U.S. PATENT DOCUMENTS 3,681,664 A * 8/1972 Metzger .................. G04F 5/066
361/782
3,694,710 A * 9/1972 Kirschner .............. H01G 4/255
361/321.2
(Continued)

FOREIGN PATENT DOCUMENTS

CN    105096745 A    11/2015
CN    105375458 A    3/2016
(Continued)

OTHER PUBLICATIONS

Written Opinion for PCT/KR2017/005483 dated Jul. 28, 2017.
International Search Report for PCT/KR2017/005483 dated Jul. 28, 2017.

*Primary Examiner* — Binh B Tran
*Assistant Examiner* — Krystal Robinson
(74) *Attorney, Agent, or Firm* — Renaissance IP Law Group LLP

(57) ABSTRACT

Provided is a contactor disposed on a conductor coming into contact with a user of an electronic device and an internal circuit. The contactor includes a contact part and an electric shock prevention part, which are disposed to face each other, and, of which at least portions respectively come into contact with the conductor and the internal circuit, wherein the electric shock prevention part includes a laminate in which a plurality of insulation sheets are vertically laminated between the internal circuit and the conductor and an external electrode disposed on a side surface of the laminate, and at least one portion of the external electrode extends to one surface of the laminate and is connected to a ground terminal or the conductor, and at least the other portion (Continued)

extends to the other surface of the laminate to come into contact with the contact part.

10 Claims, 8 Drawing Sheets

(51) Int. Cl.
    *H01G 2/14*            (2006.01)
    *H01C 7/18*            (2006.01)
    *H01G 4/40*            (2006.01)
    *H01G 4/30*            (2006.01)
    *H01R 13/24*           (2006.01)

(52) U.S. Cl.
    CPC ................. *H01G 4/30* (2013.01); *H01G 4/40* (2013.01); *H01R 13/24* (2013.01); *H01R 13/2442* (2013.01)

(56) References Cited

U.S. PATENT DOCUMENTS

| | | | | |
|---|---|---|---|---|
| 4,112,480 A * | 9/1978 | Johanson | ............. | H01G 5/0136 361/271 |
| 4,979,423 A * | 12/1990 | Watanabe | ............ | G10H 1/0556 338/69 |
| 5,717,245 A * | 2/1998 | Pedder | ............. | H01L 23/49816 257/664 |
| 5,827,619 A * | 10/1998 | Iida | ....................... | H01M 2/105 429/1 |
| 5,947,773 A * | 9/1999 | Karam | ............... | H01R 13/6485 439/607.43 |
| 5,963,423 A * | 10/1999 | Ikeda | ..................... | H01C 1/014 361/690 |
| 6,054,798 A * | 4/2000 | Sato | ..................... | H01L 41/107 310/348 |
| 6,175,241 B1 * | 1/2001 | Hembree | ............. | G01R 31/088 324/756.02 |
| 7,362,877 B2 * | 4/2008 | Honda | ................... | H04M 1/03 381/409 |
| 2002/0027064 A1 * | 3/2002 | York | ........................ | H01G 5/18 200/181 |
| 2003/0079907 A1 * | 5/2003 | Eguchi | ................. | H01R 12/721 174/250 |
| 2005/0041367 A1 * | 2/2005 | Yoshii | ................... | H05K 3/3426 361/303 |
| 2005/0190527 A1 * | 9/2005 | Stevenson | ............ | H03H 1/0007 361/302 |
| 2007/0030113 A1 * | 2/2007 | Song | ........................ | H01C 1/14 338/309 |
| 2010/0126834 A1 * | 5/2010 | Ikehashi | ................ | G11C 23/00 200/181 |
| 2011/0194225 A1 | 8/2011 | Onishi et al. | | |
| 2013/0208395 A1 * | 8/2013 | Bultitude | ................. | H01C 1/14 361/275.1 |
| 2014/0347773 A1 * | 11/2014 | Park | ....................... | H02H 9/005 361/56 |
| 2015/0340154 A1 * | 11/2015 | Kim | ....................... | H01G 4/248 174/260 |
| 2017/0076869 A1 * | 3/2017 | Okai | ........................ | H01G 4/30 |
| 2017/0077891 A1 * | 3/2017 | Kim | ...................... | H05K 1/0231 |
| 2017/0084392 A1 * | 3/2017 | An | ........................ | H01G 4/1218 |
| 2018/0048094 A1 * | 2/2018 | Cornelius | .......... | H01R 13/6473 |
| 2019/0333700 A1 * | 10/2019 | Cho | ........................ | H01C 13/02 |

FOREIGN PATENT DOCUMENTS

| | | |
|---|---|---|
| CN | 105470685 A | 4/2016 |
| JP | 2003257781 A | 9/2003 |
| JP | 2010146779 A | 7/2010 |
| KR | 100876206 B1 | 12/2008 |
| KR | 101585604 B1 | 1/2016 |
| KR | 101585619 B1 | 1/2016 |
| TW | 200416612 A | 9/2004 |

\* cited by examiner

100 : 101~111   200 : 201~208
310 : 311, 312   2000 : 2610, 2620

100 : 101~111   200 : 201~208
310 : 311, 312   2600 : 2610, 2620
2000 : 2100~2600

CONTACTOR

TECHNICAL FIELD

The present disclosure relates to a contactor, and more particularly, to a contactor, which is capable of preventing an electric shock voltage from being transmitted to a user through an electronic device using a charger or transformer of a smartphone and the like.

BACKGROUND

Various components are integrated into electronic devices having multifunction such as smartphones according to their functions. Also, electronic devices are provided with antennas capable of receiving various frequency bands such as a wireless LAN (wireless LAN), a Bluetooth (Bluetooth), and a GPS (Global Positioning System). A portion of the antennas may be provided as a built-in antenna and installed in a case constituting each of the electronic devices. Thus, a contactor for electrically connecting the antenna installed in the case to a built-in circuit board of the electronic device is installed.

In recent years, with an increased emphasis on the elegant image and durability of the electronic device, the supply of a terminal including a case made of a metal material is increasing. That is, the supply of a smartphone of which a border is made of a metal, or the rest case except for a front image display part is made of a metal is increasing.

However, when the case is made of the metal material, an electrostatic discharge (ESD) voltage such as static electricity having a high voltage may be momentarily introduced through the external metal case, and then, the ESD voltage may be introduced into an internal circuit through the contactor to damage the circuit.

Also, since an overcurrent protection circuit is not built in the electronic device to which a metal case is applied, or charging is performed by using a non-genuine charger or a faulty charger using a low-quality element, shock current may occur. The shock current may be transmitted to a ground terminal of the smartphone and then transmitted again from the ground terminal to the metal case. Thus, a user coming into contact with the metal case may get shocked. As a result, when the smartphone is used while the smartphone using the metal case is charged by using the non-genuine charger, an electric shock accident may occur.

Accordingly, it is necessary to provide a contactor that is capable of preventing the internal circuit from being damaged and preventing the user from being electrically shocked.

PRIOR ART DOCUMENT

Korean Patent Registration No. 10-0876206

DISCLOSURE

Technical Problem

The present disclosure provides a contactor provided in an electronic device such as a smartphone.

The present disclosure also provides a contactor capable of preventing a user from being electrically shocked and preventing an internal circuit from being damaged by an ESD voltage.

The present disclosure also provides a contactor that is not electrically broken down by an ESD voltage.

Technical Solution

In accordance with an exemplary embodiment, a contactor disposed on a conductor coming into contact with a user of an electronic device and an internal circuit includes: a contact part and an electric shock prevention part, which are disposed to face each other, and, of which at least portions respectively come into contact with the conductor and the internal circuit, wherein the electric shock prevention part includes a laminate in which a plurality of insulation sheets are vertically laminated between the internal circuit and the conductor and an external electrode disposed on a side surface of the laminate, and at least one portion of the external electrode extends to one surface of the laminate and is connected to a ground terminal or the conductor, and at least the other portion extends to the other surface of the laminate to come into contact with the contact part.

The contact part may be fixed to the conductor, and the electric shock prevention part may be fixed to the internal circuit, or the contact part may be fixed to the internal circuit, and the electric shock prevention part may be fixed to the contact part.

The contact part may have conductivity and elasticity.

The contact part may include a protrusion in which at least a portion of the contact part protrudes from an area fixed to the conductor toward the electric shock prevention part.

The contact part may include an elastic body and a conductive layer surrounding the elastic body.

The electric shock prevention part may include at least one of a capacitor part and an ESD protection part, which are disposed in the laminate, and at least one dummy layer.

The ESD protection part may include at least two or more discharge electrodes vertically or horizontally spaced apart from each other and an ESD protection layer disposed between the discharge electrodes and including at least one of a porous insulation material, a conductive material, a mixture of the porous insulation material and the conductive material, and a void.

The ESD protection part may include a varistor or diode having a breakdown voltage that is greater than an electric shock voltage and less than an ESD voltage.

The dummy layer may be disposed on at least one of upper and lower portions of a device formation layer on which at least one of the capacitor part and the ESD protection part is disposed.

The dummy layer may have a thickness greater than at least one of a thickness of the ESD protection layer, a thickness between internal electrodes of the capacitor part, a thickness between the ESD protection layer and each of the internal electrodes, and a thickness of the lowermost insulation sheet.

Advantageous Effects

The contactor in accordance with the exemplary embodiments may include the contact part and the electric shock prevention part and be disposed between the conductor that comes into contact with the user of the electronic device and the internal circuit. That is, the contact part and the electric shock prevention part may be provided to come into contact with the conductor and the internal circuit, respectively. Also, the electric shock prevention part may include the capacitor part and the EDS protection part.

In accordance with the exemplary embodiments, the ESD protection part of the electric shock prevention part may bypass the ESD voltage to the ground terminal of the internal circuit to prevent the internal circuit from being damaged by the ESD voltage and block the electric shock voltage that is below the discharge starting voltage or the breakdown voltage to prevent the user from being electrically shocked.

Also, the communication signal may be transmitted to and received from the outside by using the capacitor part to reduce or minimize the attenuation of the signal.

BRIEF DESCRIPTION OF THE DRAWINGS

Exemplary embodiments can be understood in more detail from the following description taken in conjunction with the accompanying drawings, in which.

Hereinafter, embodiments of the present invention will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
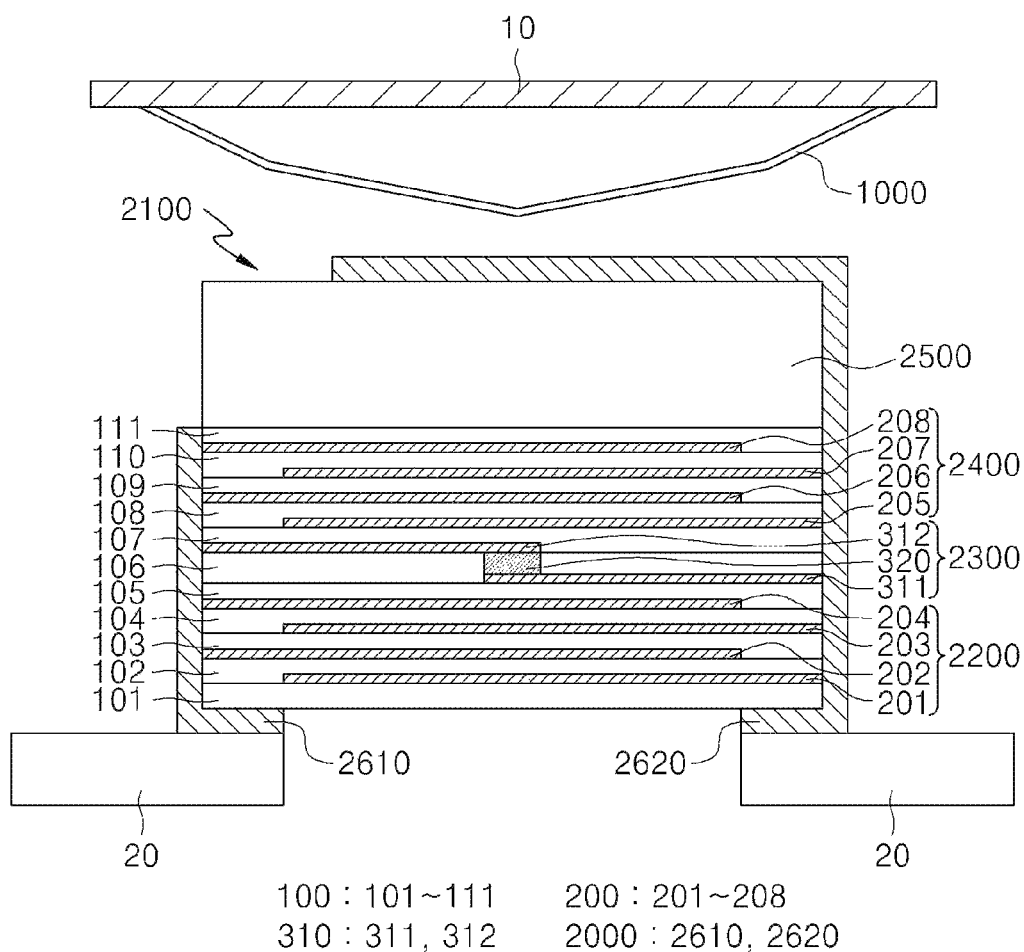
FIG. 1 is a cross-sectional view of a contactor in accordance with an exemplary embodiment.
Figure 2:
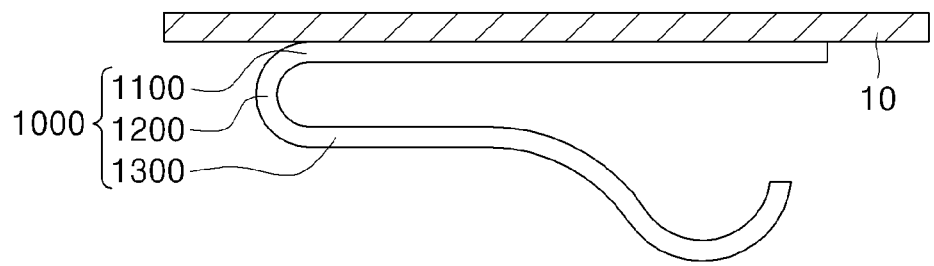
FIGS. 2 to 4 are cross-sectional views illustrating a contact part of a contactor in accordance with other exemplary embodiments.
Figure 3:
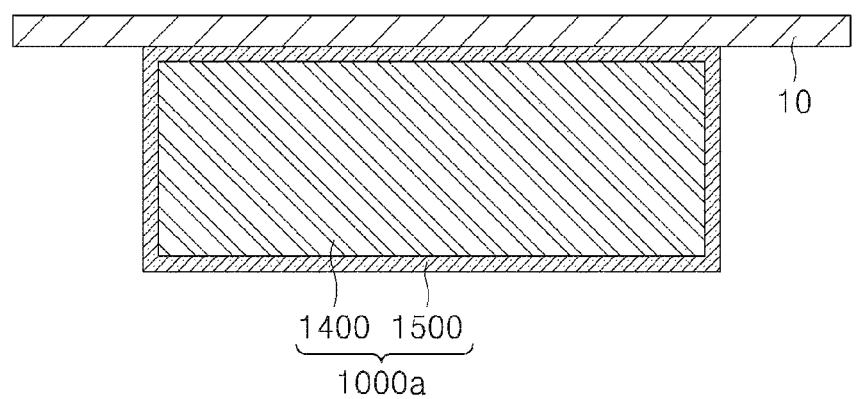
Figure 4:
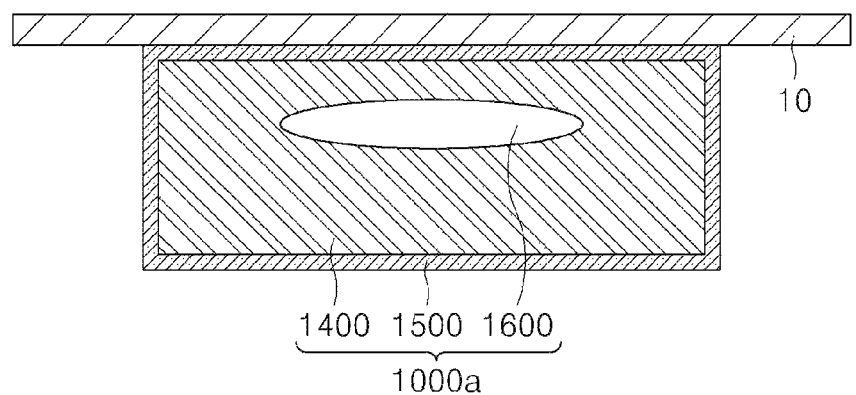
Figure 5:
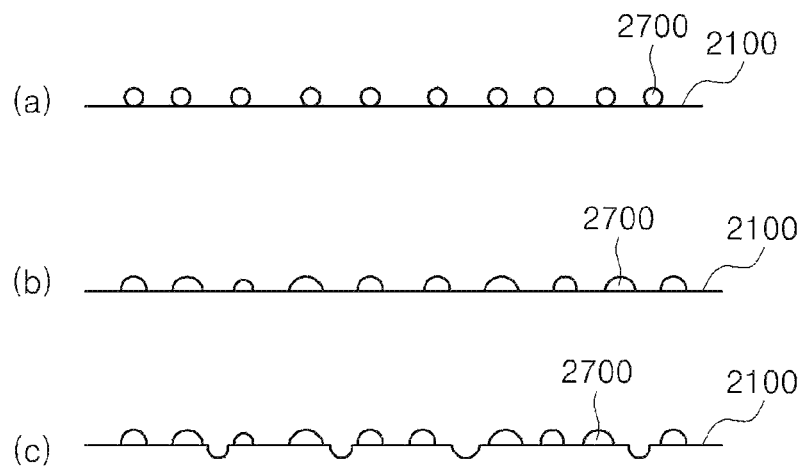
FIG. 5 is a schematic view illustrating a surface of the electric shock prevention part of the contactor in accordance with an exemplary embodiment.

FIG. 1 is a cross-sectional view of a contactor in accordance with an exemplary embodiment. Also, FIGS. 2 to 4 are cross-sectional views illustrating a contact part of a contactor in accordance with other exemplary embodiments. Also, FIG. 5 is a schematic view illustrating a surface of the electric shock prevention part of the contactor in accordance with an exemplary embodiment.

Referring to FIG. 1, a contactor in accordance with an exemplary embodiment may be disposed between a conductor 10 that is disposed outside an electronic device to come into contact with a user and an internal circuit 20 that is disposed in the electronic device to perform various functions of the electronic device. Also, the contactor may include a contact part 1000 of which at least a portion comes into contact with the conductor 10 and an electric shock prevention part 2000 of which at least a portion comes into contact with the internal circuit 20. Here, the conductor 10 may define the entire outer appearance of the electronic device. As occasion demands, the conductor 10 may include a case that serves as an antenna for communicating with the outside. Also, the internal circuit 20 may include a plurality of passive devices and active devices, which are provided for performing the various functions of the electronic device and further include a ground terminal disposed on an area thereof. For example, the internal circuit 20 may be a printed circuit board (PCB) on which the plurality of passive devices and active devices are mounted, and the ground terminal is disposed on at least an area thereof.

1. Contact Part

The contact part 1000 may have elasticity to reduce an impact when external force is applied to the electronic device from the outside. The contact part 30 may be made of a material including a conductive material. The contact part 1000 may have a clip shape attached to the conductor 10 of the electronic device. For example, as illustrated in FIG. 1, the contact part 1000 may have a shape in which both ends of the contact part 1000 come into contact with the conductor 10, and the contact part 1000 protrudes from both the ends thereof to a central portion. That is, the contact part 1000 may have a shape in which the contact part 1000 approaches the electric shock prevention part 2000 from both the ends to the central portion. Also, one area of the contact part 1000, which comes into contact with the conductor 10 may extend inward or outward to increase a contact area with the conductor 10. The contact part 1000 may have a predetermined width. Here, the contact part 1000 may have a width less than that of the electric shock prevention part 2000. Alternatively, the contact part 1000 may have the same width as the electric shock prevention part 2000. When external force is applied to the electronic device from the outside, the width of the contact part 1000 may be adjusted within a range having elasticity that is enough to reduce the impact. For example, the contact part 1000 may have a width corresponding to 5% to 100% of the width of the electric shock prevention part 2000.

Also, the contact part 1000 may be manufactured in various shapes. For example, as illustrated in FIG. 2, the contact part 1000 may have a shape in which the contact part 100 comes into contact with the conductor 10 and is curved toward the electric shock prevention part 2000. That is, as illustrated in FIG. 2, the contact part 1000 may include a flat plate 1100 coming into contact with the conductor 10 and having a flat plate shape, an extension 1200 connected to one end of the flat plate 1100 to extend, and a protrusion 1300 protruding from the extension 1200 to the electric shock prevention part 2000. The flat plate 1100 may be provided in the flat plate shape and fixed to one surface of the conductor 10. The extension 1200 may be connected to an end of the flat plate 1100 to extend to the electric shock prevention part 2000. Here, the extension 1200 may be horizontally bent. That is, the extension part 1200 may have a curved surface that is convex in a direction opposite to that in which the protrusion 1300 is disposed. Also, the protrusion 1300 may be connected to an end of the extension 1200 and disposed in a direction in which the flat plate 1100 is disposed. Here, the protrusion 1300 may include a first area horizontally extending from the portion thereof connected to the extension 1200 and a second area that is curved from an end of the first area to the electric shock prevention part 2000. Thus, the curved portion of the protrusion 1300 may face the electric shock prevention part 2000. At least a portion of the contact part 1000 may have elasticity. That is, at least one of the extension 1200 and the protrusion 1300 may have elasticity. For example, the extension 1200 may have elasticity, and thus, when the extension 1200 is pressed by the external force, the extension 1200 may be pushed in a direction in which the internal circuit 20 is disposed, and when the external force is released, the extension 1200 may return to its original position. The contact part 1000 may be made of a conductive material including a metal such as copper (Cu).

Also, the contact part 1000 may be a gasket. That is, as illustrated in FIG. 3, a contact part 1000a having a gasket shape may be disposed between the conductor 10 and the electric shock prevention part 2000, and the contact part 1000a may come into surface contact with the conductor 10 and be spaced apart from the electric shock prevention part 2000. Here, the contact part 1000a having the gasket shape may include an internal member 1400 having elasticity and a conductive layer 1500 disposed on a surface of the internal member 1400. The internal member 1400 may be formed by using a polymer synthetic resin such as polyurethane foam, polyvinyl chloride (PVC), silicone, ethylene vinylacetate copolymer, and polyethylene, rubber such as natural rubber (NR), styrene butadiene rubber (SBR), ethylene propylene diene monomer (EPDM) rubber, nitrile butadiene rubber (NBR), and neoprene, solid sheets, or a sponge sheet. The conductive layer 1500 may be disposed to surround an outer circumferential surface of the internal member 1400. Here, the conductive layer 1500 may be made of various conductive materials such as carbon black, graphite, gold, silver, copper, nickel, and aluminum. Also, as illustrated in FIG. 4, a hole 1600 may be defined in the internal member 1400. The hole 1600 may be adjunctively provided to improve the elasticity of the gasket and an impact reducing effect. Here, the hole 1600 may various shapes such as a circular shape, an oval shape, and a polygonal shape.

As described above, the contact part 1000 may come into contact with the conductor 10 coming into contact with the user such as the case of the electronic device. For example, the contact part 100 may be disposed to come into contact with the case and also come into contact with the conductor that serves as an antenna for receiving and transmitting a communication signal from/to the outside. Alternatively, the case may serve as the antenna.

2. Electric Shock Prevention Part

The electric shock prevention part 2000 may have one end coming into contact with the internal circuit 20 and the other end coming into contact with the contact part 1000. That is, the other end of the electric shock prevention part 2000 may come into contact with the contact part 1000 or be spaced apart from the contact part 1000. The electric shock prevention part 2000 may include a laminate 2100 on which a plurality of insulation sheets 100 (101 to 111) are laminated, at least one capacitor part 200 and 400 provided in the laminate 2100 and including a plurality of internal electrodes 200 (201 to 208), and an ESD protection part 2300 including at least one discharge electrode 310 (311 and 312) and an ESD protection layer 320. Also, the electric shock prevention part 2000 may further include a dummy layer 2500 having a predetermined thickness, which is disposed in the laminate 2100 and in which the conductive layer is not provided. That is, a conductive layer including the plurality of internal electrodes 200 and a discharge electrode 310 may be selectively disposed on the plurality of insulation sheets 100 within the laminate 210, and the dummy layer 2500 may be disposed on the insulation sheet 100 on which the conductive layer is disposed. For example, first and second capacitor parts 2200 and 4000 may be disposed in the laminate 2100, and the ESD protection part 2300 may be disposed between the first and second capacitor parts 2000 and 4000. Also, the dummy layer 2500 may be disposed on the second capacitor part 400. That is, the first capacitor part 200, the ESD protection part 2300, the second capacitor part 2400, and the dummy layer 2500 may be laminated in the laminate 2100 to form the electric shock prevention part 2000. Also, the electric shock prevention part 2000 may further include external electrodes 2600 (2610 and 2620) disposed on two side surfaces facing each other of the laminate 2100 to connect the first and second capacitor parts 2200 and 2400 to an ESD protection part 2300. Alternatively, the electric shock prevention part 2000 may include at least one capacitor part and at least one ESD protection part. That is, one capacitor part may be disposed below or above the ESD protection part 2300, and at least one capacitor part may be disposed above and below at least two ESD protection parts 2300 spaced apart from each other. Also, the ESD protection part 2300 may be disposed inside or outside the laminate 2100. In the current embodiments, a case in which the ESD protection part 3000 is disposed inside the laminate 2100 will be described. When the ESD protection part 2300 is disposed outside the laminate 2100, the ESD protection layer 320 may be disposed between the laminate 2100 and the external electrode 2600, and the discharge electrode 310 may be disposed in the laminate 2100. As illustrated in FIG. 1, the electric shock prevention part 2000 may be disposed on the internal circuit 20 (e.g., PCB) of the electronic device. That is, the electric shock prevention part 2000 may have one side come into contact with the internal circuit 20 and the other side spaced apart from the conductor 10 of the electronic device. Here, since the contact part 1000 is disposed between the conductor 10 and the electric shock prevention part 2000, the electric shock prevention part 2000 may have the other side coming into contact with the contact part 1000. Alternatively, the other side of the electric shock prevention part 2000 may be spaced apart form the contact part 1000 and then come into contact with the contact part 1000 by the external force. As described above, the electric shock prevent part 2000 may be disposed between the conductor 10 and the internal circuit 20 to block an electric shock voltage applied from the internal circuit 20. Also, the electric shock prevention part may bypass an ESD voltage to a ground terminal and continuously block the electric shock voltage because the insulation is not broken by the ESD. That is, the electric shock prevention part 2000 in accordance an exemplary embodiment may maintain the insulation state at the electric shock voltage or less to block the electric shock voltage applied from the internal circuit 20. Also, the electric shock prevention part 2000 may maintain the conductive state at the ESD voltage or more to bypass the ESD voltage, which is applied to the inside of the electronic device from the outside, to the ground terminal.

2.1. Laminate

The laminate 2100 may be manufactured by laminating the plurality of insulation sheets 100 (101 and 111) and the dummy layer 2500. Here, at least one capacitor part 2200 and 2400 and at least one ESD protection part 2300 may be provided in the plurality of insulation sheets 100. The laminate 2100 may have an approximately hexahedral shape that has predetermined lengths and widths in one direction (e.g., an X-direction) and the other direction (e.g., a Y-direction) perpendicular to the one direction and has a predetermined height in a vertical direction (e.g., a Z-direction). That is, when a formation direction of the external electrode 2600 is defined as the X-direction (i.e., a length direction), a direction horizontally perpendicular to the X-direction may be defined as the Y-direction (i.e., a width direction), and a vertical direction of the X-direction may be defined as the Z-direction (i.e., a height or thickness direction). Here, a length in the X-direction may be greater than or equal to each of a width in the Y-direction and a height in the Z-direction. The width in the Y-direction may be equal to or different from the height in the Z-direction. For example, a ratio of the length, the width, and the height may be 1 to 5:1 to 5:1 to 5. That is, the length, the width, and the height may be adjusted in a range of one time to five times. However, the dimensions in the X, Y, and Z-directions may be merely examples. For example, the dimensions in the X, Y, and Z-directions may variously vary according to an inner structure of the electronic device connected to the electric shock prevention part and a shape of the electric shock prevention part. Also, at least one capacitor part 2200 and 2400 and at least one ESD protection part 2300 may be provided in the laminate 2100. Also, the dummy layer 2500 may be provided. For example, the first capacitor part 2200, the ESD protection part 2300, the second capacitor part 2400, and the dummy layer 2500 may be disposed in the Z direction. Each of the plurality of insulation sheets 100 may be made of a material containing at least one of dielectric material powder such as MLCC, $BaTiO_3$, $BaCO_3$, $TiO_2$, $Nd_2O_3$, $Bi_2O_3$, ZnO, and $Al_2O_3$. Thus, each of the plurality of insulation sheets 100 may have a predetermined dielectric constant, for example, a dielectric constant of 5 to 20,000, preferably, a dielectric constant of 7 to 5,000, more preferably, a dielectric constant of 200 to 3,000 in accordance with a material thereof. Also, the plurality of insulation sheets 100 may have the same thickness, or at least one insulation sheet 100 may have a thickness greater or less than that of the other insulation sheet 100. That is, the insulation sheet of the ESD protection part 2300 may have a thickness different from that of the insulation sheet of each of the first and second capacitor parts 2200 and 2400. Also, each of the insulation sheets disposed between the ESD protection member 2300 and the first and second capacitor parts 2200 and 2400 may have a thickness different from that of the other insulation sheet. For example, each of the insulation sheets disposed between the ESD protection part 2300 and the first and second capacitor parts 2200 and 2400, i.e., each of fifth and seventh insulation sheets 105 and 107 may have a thickness less than or equal to that of the insulation sheet of the ESD protection part 2300, i.e., a sixth insulation sheet 106 or have a thickness less than or equal to that of each of the insulation sheets 102 to 104 and 108 to 110 disposed between the internal electrodes of the first and second capacitor parts 2200 and 2400. That is, a space between the ESD protection part 2300 and each of the first and second capacitor parts 2200 and 2400 may be less than or equal to that between the internal electrodes of the first and second capacitor parts 2200 and 2400 or may be less than or equal to the thickness of the ESD protection part 2300. Alternatively, the insulation sheets 102 to 104 and 108 to 110 of the first and second capacitor parts 2200 and 2400 may have the same thickness, or one insulation sheet may have a thickness less or greater than that of the other insulation sheet. One of the insulation sheets 102 to 104 and 108 to 110 of the first and second capacitor parts 2200 and 2400 may have a different thickness to adjust capacitance. For example, each of the plurality of insulation sheets 100 may have a thickness of 1 μm to 5,000 μm, i.e., a thickness of 2,500 μm or less. Here, each of the insulation sheets 100 may have a thickness at which the insulation sheets are not broken when the ESD is applied. That is, when the insulation sheets 100 are applied to the electric shock prevent part 2000, which has a relatively small size, each of the insulation sheets 100 may have a thin thickness. On the other hand, when the insulation sheets 100 are applied to the electric shock prevention part 2000, which has a relatively large size, each of the insulation sheets 100 may have a thickness at which the insulation sheets are not broken on all occasions when the ESD is applied. For example, when the insulation sheets 100 are laminated in the same number, the more the electric shock prevention part 2000 decreases in size, the more the thickness decreases. Also, the more the electric shock prevention part 2000 increases in size, the more the thickness increases. Alternatively, a thin insulation sheet 100 may be applied to the electric shock prevention part 2000, which has a relatively large size. In this case, the laminated number of insulation sheets may increase. Also, the laminate 2100 may further include a lower cover layer (not shown) and an upper cover layer (not shown), which are respectively disposed on a lower portion of the first capacitor part 2200 and an upper portion of the dummy layer 2500. Alternatively, the first insulation sheet 101 may function as the lower cover layer, and at least a portion of the dummy layer 2500 may function as the upper cover layer. The lower and upper cover layers may be prepared by laminating a plurality of magnetic sheets on each other and have the same thickness. For example, at least one magnetic sheet may be disposed below the first insulation sheet 101 and above the dummy layer 2500. Alternatively, the first insulation sheet 101 may be made of a magnetic material, and at least a portion of an upper portion of the dummy layer 2500 may be made of a magnetic material. Also, a non-magnetic sheet, e.g., a sheet made of a glass material may be further disposed on the outermost portions of the lower and upper cover layers constituted by the magnetic sheets, i.e., surfaces of the lower and upper portions of the cover layers. Also, each of the lower and upper cover layers may have a thickness greater than that of each of the insulation sheets 100 therein. Thus, when the first insulation sheet 101 functions as the lower cover layer, the first insulation sheet 101 may have a thickness greater than that of each of the second to tenth insulation sheets 102 to 110.

2.2. First Capacitor Part

The first capacitor part 2200 may be disposed below the ESD protection part 2300 and include at least two internal electrodes and at least two insulation sheets between the at least two internal electrodes. For example, the first capacitor part 2200 may include the first to fourth insulation sheets 101 to 104 and the first to fourth internal electrodes 201 to 204 that are respectively disposed on the first to fourth insulation sheets 101 to 104. For example, each of the first to fourth internal electrodes 201 to 204 may have a thickness of 1 μm to 10 μm. Here, the first to fourth internal electrodes 201 to 204 may have sides connected to the external electrodes 2600 (2610 and 2620) facing each other in the X-direction and the other sides spaced apart from each other. The first and third internal electrodes 201 and 203 have predetermined areas on the first and third insulation sheets 101 and 103, respectively. Also, each of the first and third internal electrodes 201 and 203 has one side connected to the first external electrode 2610 and the other side spaced apart from the second external electrode 2620. The second and fourth internal electrodes 202 and 204 may have predetermined areas on the second and fourth insulation sheets 102 and 104, respectively. Also, each of the second and fourth internal electrodes 202 and 204 may have one side connected to the second external electrode 2620 and the other side spaced apart from the first external electrode 2610. That is, the first to fourth internal electrodes 201 to 204 may be alternately connected to one of the external electrodes 2600 to allow predetermined areas of the first to fourth internal electrodes 201 to 204 to respectively overlap the second to fourth insulation sheets 101 to 104 with the second to fourth insulation sheets 101 to 104 therebetween. Here, 10% to 95% of an area of each of the first to fourth internal electrodes 201 and 204 to that of each of the first to fourth insulation sheets 101 to 104 may overlap each of the first to fourth insulation sheets 101 to 104. Also, 10% to 95% of an area of each of the first to fourth internal electrodes 201 to 204 to the total area thereof may overlap each other. Each of the first to fourth internal electrodes 201 to 204 may have various shapes such as a square shape, a rectangular shape, a predetermined pattern shape, and a spiral shape having a predetermined width and distance. The first capacitor part 2200 has capacitance between the first to fourth internal electrodes 201 to 204. The capacitance may be adjusted according to the length or overlapping area of each of the first to fourth internal electrodes 201 to 204 and the thickness of each of the insulation sheets 101 to 104. The first capacitor part 2200 may further include at least one internal electrode in addition to the first to fourth internal electrodes 201 to 204 and at least one insulation sheet on which the at least one internal electrode is disposed. Also, the first capacitor part 2200 may include two internal electrodes. Although the first capacitor part 2000 including four internal electrodes is described as an example, at least two internal electrodes, i.e., a plurality of internal electrodes may be provided.

2.3. ESD Protection Part

The ESD protection part 2300 may include at least two discharge electrodes 310 (311 and 312) that are vertically spaced apart from each other and at least one ESD protection layer 320 disposed between the at least two discharge electrodes 310. For example, the ESD protection part 2300 may include fifth and sixth insulation sheets 105 and 106, first and second discharge electrodes 311 and 312 respectively disposed on the fifth and sixth insulation sheets 105 and 106, and an ESD protection layer passing through the sixth insulation sheet 106. Here, the ESD protection layer 320 may have at least a portion connected to the first and second discharge electrodes 311 and 312. The first and second discharge electrodes 311 and 312 may have the same thickness as each of the internal electrodes 200 of the capacitor parts 2000 and 4000. For example, each of the first and second discharge electrodes 311 and 312 may have a thickness of 1 μm to 10 μm. However, each of the first and second discharge electrodes 311 and 312 may have a thickness less than that of the internal electrode 200 of each of the capacitor parts 2000 and 4000. The first discharge electrode 311 may be connected to the first external electrode 2610 and disposed on the fifth insulation sheet 105 and have an end connected to the ESD protection layer 320. The second discharge electrode 312 be connected to the second external electrode 2620 and disposed on the sixth insulation sheet 106 and have an end connected to the ESD protection layer 320. Here, an area of each of the first and second discharge electrodes 311 and 312, which comes into contact with the ESD protection layer 320, may be equal to or less than that of the ESD protection layer 320. Also, the first and second discharge electrodes 311 and 312 may completely overlap the ESD protection layer 320 without getting out of the ESD protection layer 320. That is, edges of the first and second discharge electrodes 311 and 312 may vertically match an edge of the ESD protection layer 320 to form a vertical component. Alternatively, the first and second discharge electrodes 311 and 312 may overlap a portion of the ESD protection layer 320. For example, each of the first and second discharge electrodes 311 and 312 may overlap 10% to 100% of a horizontal area of the ESD protection layer 320. That is, the end of each of the first and second discharge electrodes 311 and 312 may be formed without getting out of the ESD protection layer 320. An area of each of the first and second discharge electrodes 311 and 312, which comes into contact with the ESD protection layer 320, may be greater than an area of each of the first and second discharge electrodes 311 and 312, which does not contact the ESD protection layer 320. The ESD protection layer 320 may be connected to a predetermined area of the sixth insulation sheet 106. For example, the ESD protection layer 320 may be disposed at a central portion and connected to the first and second discharge electrodes 311 and 312. Here, at least a portion of the ESD protection layer 320 may overlap each of the first and second discharge electrodes 311 and 312. That is, 10% to 100% of the horizontal area of the ESD protection layer 320 may overlap each of the first and second discharge electrodes 311 and 312. The ESD protection layer 320 may have a through hole having a predetermined size in a predetermined area, e.g., the central portion of the sixth insulation sheet 106. Then, at least a portion of the through hole may be applied or filled by using a printing process. The ESD protection layer 320 may have a thickness that corresponds to 1% to 2% of a thickness of the laminate 2100 and a length that corresponds to 3% to 50% of a length in one direction of the laminate 2100. Here, when the ESD protection layer 320 is provided in plurality, the sum of thicknesses of the plurality of ESD protection layers 320 may 1% to 5% of the thickness of the laminate 2100. Also, the ESD protection layer 320 may have a long hole shape in at least one direction, e.g., the X-direction, and the length in the X-direction may be 5% to 75% of the length of the insulation sheet 100 in the X-direction. Also, the width of the ESD protection layer 320 in the Y-direction may be 3% to 50% of the width of the insulation sheet 100 in the Y-direction. For example, the ESD protection layer 320 may have a diameter of 50 μm to 1,000 μm and a thickness of 5 μm to 200 μm. Here, when the thickness of the ESD protection layer 320 is thinner, the discharge starting voltage may be reduced. The ESD protection layer 320 may be made of a conductive material and an insulation material. Here, the insulation material may be a porous insulation material having a plurality of pores. For example, a mixed material of conductive ceramic and insulation ceramic may be printed on the sixth insulation sheet 106 to form the ESD protection layer 320. The ESD protection layer 320 may be disposed on at least one insulation sheet 100. That is, the ESD protection layer 320 may be disposed on at least one insulation sheet 100 that vertically laminated on each other, e.g., two insulation sheets 100. Here, the discharge electrodes may be disposed to be spaced apart from each other on the insulation sheets 100 and be connected to the ESD protection layer 320. A structure and material of the ESD protection layer 320 will be described later in more detail.

2.4. Second Capacitor Part

The second capacitor part 2400 may be disposed above the ESD protection part 2300 and include at least two internal electrodes and at least two insulation sheets between the at least two internal electrodes. For example, the second capacitor part 2200 may include the seventh to tenth insulation sheets 107 to 110 and the fifth to eighth internal electrodes 205 to 208 that are respectively disposed on the seventh to tenth insulation sheets 107 to 110. Here, the fifth to eighth internal electrodes 205 to 208 may have sides connected to the external electrodes 2600 (2610 and 2620) facing each other in the X-direction and the other sides spaced apart from each other. Each of the fifth and seventh internal electrodes 201 and 205 has a predetermined area on each of the seventh and ninth insulation sheets 107 and 109. Also, each of the fifth and seventh internal electrodes 205 and 207 has one side connected to the first external electrode 2610 and the other side spaced apart from the second external electrode 2620. The sixth and eighth internal electrodes 206 and 208 may have predetermined areas on the eighth and tenth insulation sheets 108 and 110, respectively.

Also, each of the second and fourth internal electrodes 202 and 204 may have one side connected to the second external electrode 2620 and the other side spaced apart from the first external electrode 2610. That is, the fifth to eighth internal electrodes 205 to 208 may be alternately connected to one of the external electrodes 2600 to allow predetermined areas of the fifth to eight internal electrodes 205 to 208 to respectively overlap the eighth to tenth insulation sheets 108 to 110 with the eighth to tenth insulation sheets 108 to 110 therebetween. Here, 10% to 85% of an area of each of the fifth to eight internal electrodes 205 and 208 to that of each of the seventh to tenth insulation sheets 107 to 110 may overlap each of the seventh to tenth insulation sheets 107 to 110. Also, 10% to 85% of an area of each of the fifth to eight internal electrodes 205 to 208 to the total area thereof may overlap. For example, each of the fifth to eight internal electrodes 205 to 208 may have a thickness of 1 μm to 10 μm. Each of the fifth to eight internal electrodes 205 to 208 may have various shapes such as a square shape, a rectangular shape, a predetermined pattern shape, and a spiral shape having a predetermined width and distance. The second capacitor part 2400 has capacitance between the fifth to eighth internal electrodes 205 to 208. The capacitance may be adjusted according to the length or overlapping area of each of the fifth to eighth internal electrodes 205 to 208 and the thickness of each of the insulation sheets 108 to 110. The second capacitor part 2400 may further include at least one internal electrode in addition to the third and fourth internal electrodes 203 to 204 and at least one insulation sheet on which the at least one internal electrode is disposed. Also, the second capacitor part 2400 may include two internal electrodes. Although the second capacitor part 4000 including four internal electrodes is described as an example, at least two internal electrodes, i.e., a plurality of internal electrodes may be provided.

Each of the internal electrodes 210 to 204 of the first capacitor part 2200 and each of the internal electrodes 205 to 208 of the second capacitor part 2400 may have the same shape and area and also the same overlapping area. Also, each of the insulation sheets 101 to 104 of the first capacitor part 2200 and each of the insulation sheets 107 to 110 of the second capacitor part 2400 may have the same thickness. Here, when the first insulation sheet 101 functions as the lower cover layer, the first insulation sheet 101 may have a thickness greater than that of each of the rest insulation sheets. Thus, the first and second capacitor parts 2000 and 4000 may have the same capacitance. However, the first and second capacitor parts 2000 and 4000 may have capacitances different from each other. In this case, at least one of the areas or lengths of the internal electrodes, the overlapping areas of the internal electrodes, and the thicknesses of the insulation sheets may be different from each other. Also, each of the internal electrodes 210 to 208 of the capacitor parts 2000 and 4000 may have a length greater than or equal to that of the discharge electrode 310 of the ESD protection part 2300 and an area greater than or equal to that of the discharge electrode 310.

Each of the internal electrodes 210 to 208 of the capacitor parts 2000 and 4000 may have a thickness that corresponds to 0.05% to 50% of the thickness of the laminate 2100. That is, the sum of the thicknesses of the internal electrodes 201 to 208 may be 0.05% to 50% of the thickness of the laminate 2100. Here, the internal electrodes 201 to 208 may have the same thickness, or at least one of the internal electrodes 201 to 208 may have a different thickness. For example, at least one of the internal electrodes 201 to 208 may be thicker than each of other internal electrodes. Also, at least one region of each of the internal electrodes 201 to 208 may have a thickness different from that of the other region. However, when at least one of the internal electrodes 201 to 208 has a different thickness, and at least one region of each of the internal electrodes 201 to 208 has a different thickness, the sum of the thicknesses of the internal electrodes 201 to 208 may be 0.05% to 50% of the thickness of the laminate 2100. Also, the internal electrodes 210 to 208 of the capacitor parts 2000 and 4000 may have a cross-sectional area that corresponds to 0.05% to 50% of a cross-sectional area of the laminate 2100. That is, the sum of the cross-sectional area of the internal electrodes 201 to 208 in the thickness direction, i.e., the Z-direction may be 0.05% to 50% of the thickness of the laminate 2100. Here, the internal electrodes 201 to 208 may have the same cross-sectional area, or at least one of the internal electrodes 201 to 208 may have a different cross-sectional area. However, at least one of the internal electrodes 201 to 208 has a different cross-sectional area, the sum of the cross-sectional areas of the internal electrodes 201 to 208 may be 0.05% to 50% of the cross-sectional area of the laminate 2100. Also, the internal electrodes 210 to 208 of the capacitor parts 2000 and 4000 may have a length and width that correspond to 95% or less of the length and width of the insulation sheet 100. That is, the length of each of the internal electrodes 201 to 208 in the X-direction may be 10% to 95% of the length of the insulation sheet 100 in the X-direction, and the width in the Y-direction may be 10% to 95% of the width of the insulation sheet 100 in the Y-direction. However, since at least a portion of the internal electrodes 201 to 208 has to overlap the insulation sheet 100 with the insulation sheet 100 therebetween, each of the internal electrodes 201 to 208 may have a length and width that correspond to 50% to 95% of the length and width of the insulation sheet 100, preferably, 80% to 90% of the length and width of the insulation sheet 100. Here, at least one of the internal electrodes 201 to 208 may have a length different from that of the other internal electrode. For example, one internal electrode may have a length greater or less than that of each of the other internal electrodes. When one internal electrode has a length greater than that of each of other internal electrodes, the overlapping area may increase. On the other hand, when one internal electrode has a length less than that of each of other internal electrodes, the overlapping area may decrease. Thus, at least one internal electrode may have a different length to adjust the capacitance.

2.5. Dummy Layer

The dummy layer 2500 may be provided in the laminate 2100. For example, the dummy layer 2500 may be disposed above the second capacitor part 2400. The dummy layer 2500 may be made of the same material as the plurality of insulation sheets 100. That is, the dummy layer 2500 may be made of a material containing at least one of dielectric material powder such as MLCC, $BaTiO_3$, $BaCO_3$, $TiO_2$, $Nd_2O_3$, $Bi_2O_3$, ZnO, and $Al_2O_3$. The dummy layer 2500 may be formed by laminating sheets having the same material and thickness as the insulation sheet 100. That is, a plurality of sheets having the same shape and the same thickness as the insulation sheets 100 constituting the capacitor parts 2200 and 2400 and the ESD protection part 2300 may be laminated to form the dummy layer 2500. Alternatively, the dummy layer 2500 may be made of a material different from that of the insulation sheet 100. For example, the dummy layer 2500 may be made of an insulation material such as silicon oxide, a polymer material such as a resin, or the like. However, the dummy layer 250 may be made of the same material as the insulation sheet 100 so that the dummy layer 2500 is laminated through the same process and simultaneously fired. A height of the electric shock prevention part 2000 may be adjusted by the thickness of the dummy layer 2500. That is, the dummy layer 2500 may be provided to match a height between the device formation part, on which the capacitor parts 2200 and 2400 and the ESD protection part 2300 are disposed, and the contact part 1000. Thus, the electric shock prevention part 2500 may have a height at which the contact part 1000 comes into contact between the device formation part and the contact part 1000. The dummy layer 2500 may have a thickness greater than that of one of a first thickness of the ESD protection part 2300, a second thickness between the internal electrodes 200 of the capacitor parts 2200 and 2400, a third thickness between the ESD protection part 320 and the internal electrode 200, and a fourth thickness of the first insulation sheet 110. That is, the dummy layer 2500 may have a thickness greater than that of the ESD protection part 2300, greater than that between the internal electrodes 200 of the capacitor parts 2200 and 2400, greater than that between the ESD protection layer 320 and the internal electrode 200, and greater than the lower cover layer, i.e., the first insulation sheet 110. Also, the dummy layer 2500 may have a thickness greater than that of one of the capacitor parts 2200 and 2400.

2.6. External Electrode

The external electrodes 2600 (2610 and 2620) are disposed on two side surfaces facing each other of the laminate 2100 and connected to the internal electrodes 200 of the first and second capacitor parts 2200 and 2400 and the discharge electrode 310 of the ESD protection part 2300. Also, the external electrode 2600 may extend to a bottom surface of the laminate 2100. That is, since the bottom surface of the laminate 2100 has to face the internal circuit 20, and the external electrode 2600 has to be mounted on the internal circuit 20, the first and second external electrodes 2610 and 2620 disposed on both side surfaces facing each other of the laminate 2100 may extend to the bottom surface of the laminate 2100. Here, the first and second external electrodes 2610 and 2620 extending to the bottom surface of the laminate 2100 may be spaced a predetermined distance from each other. Also, at least one of the external electrodes 2600 may extend to a top surface of the laminate 2100. That is, at least one of the external electrodes 2600, for example, the second external electrode 2620 may extend to the top surface of the laminate 2100 to come into contact with the contact part 1000 facing the top surface of the laminate 2100. Here, an area of the external electrode extending to the top surface of the laminate 2100 may have a sufficient length on the top surface of the laminate 2100 and do not come into contact with the first external electrode 2610. For example, the first external electrode 2610 may not be disposed on the top surface of the laminate 2100. When being insulated from the second external electrode 2620, the second external electrode 2620 may be disposed on an entire area of the top surface of the laminate 2100. Also, one of the external electrodes 2600, e.g., the first external electrode 2610 may not be disposed on a side surface of the dummy layer 2500. That is, the first external electrode 2610 may be disposed on the side surface of the laminate 2100 of the device formation area on which the first and second capacitor parts 2200 and 2400 and the ESD protection part 2300 are disposed, but may not be disposed on the side surface of the dummy layer 2500. Thus, the second external electrode 2620 may extend to the top surface of the laminate 2100 to come into contact with the contact part 1000, and the first and second external electrodes 2610 and 2620 may extend to the bottom surface of the laminate 2100 and be mounted on the internal circuit 20. The first external electrode 2610 may be connected to the ground terminal of the internal circuit 20, and the second external electrode 2620 may be connected to the insulation area of the internal circuit 20. Thus, the electric shock voltage applied from the ground terminal may be blocked by the electric shock prevention part 2000, and the ESD voltage applied to the outside may be bypassed to the ground terminal of the internal circuit 20 through the contact part 1000, the second external electrode 2620, the ESD protection part 2300, and the first external electrode 2610.

The external electrode 2600 may include at least one layer. The external electrode 2600 may be made of a metal layer such as Ag, and at least one plating layer may be disposed on the metal layer. For example, the external electrode 2600 may be formed by laminating a cupper layer, a Ni-plated layer, and a Sn- or Sn/Ag-plated layer. Also, the external electrode 2600 may be formed by mixing, for example, multicomponent glass frit using $Bi_2O_3$ or $SiO_2$ of 0.5% to 20% as a main component with metal powder. Here, the mixture of the glass frit and the metal powder may be prepared in the form of paste and applied to two surfaces of the laminate 2100. As described above, since the glass frit is contained in the external electrode 2600, adhesion force between the external electrode 2600 and the laminate 2100 may be improved, and contact reaction between the internal electrode 200 and the external electrode 2600 may be improved. Also, after the conductive paste containing glass is applied, at least one plating layer may be disposed on the conductive paste to form the external electrode 2600. That is, the metal layer containing the glass may be provided, and the at least one plating layer may be disposed on the metal layer to form the external electrode 2600. For example, in the external electrode 2600, after the layer containing the glass frit and at least one of Ag and Cu is formed, electroplating or electroless plating may be performed to successively form the Ni-plated layer and the Sn-plated layer. Here, the Sn-plated layer may have a thickness equal to or greater than that of the Ni-plated layer. Alternatively, the external electrode 2600 may be formed by using only at least one plating layer. That is, the plating process may be performed at least one time without applying the paste to form at least one plating layer, thereby forming the external electrode 2600. The external electrode 2600 may have a thickness of 2 μm to 100 μm. Here, the Ni-plated layer may have a thickness of 1 μm to 10 μm, and the Sn or Sn/Ag-plated layer may have a thickness of 2 μm to 10 μm.

2.7. Insulation Member

Before the external electrode 2600 is formed, oxide may be distributed on a surface of the laminate 2100 to form an insulation member 2700. That is, as illustrated in FIG. 4, the insulation member 2700 may be disposed on the surface of the laminate 10. Here, the oxide may be dispersed and distributed onto the surface of the laminate 2100 in a crystalline state or an amorphous state. Here, the oxide may be distributed before a portion of the external electrode 2600 is formed through the printing process or distributed before the plating process is performed. That is, the oxide may be distributed on the surface of the laminate 2100 before the plating process when the external electrode 2600 is formed through the plating process. At least a portion of the oxide distributed on the surface may be melted. Thus, the insulation member 2700 may be formed before the second external electrode 2600 is formed and also be formed on the surface of the laminate 2100. Here, at least a portion of the oxide may be uniformly distributed on the surface of the laminate 2100 as illustrated in (a) of FIG. 4, or at least a portion of the oxide may be non-uniformly disposed with sizes different from each other as illustrated in (b) FIG. 4. Also, as illustrated in (c) of FIG. 4, a recess part may be defined in at least a portion of the surface of the laminate 2100. That is, the oxide may be formed to form a protrusion part, and at least a portion of an area on which the oxide is not formed may be recessed to form the recess part. Since the oxide is distributed before the plating process, resistance on the surface of the laminate 2100 may be uniform, and thus, the plating process may be uniformly performed. That is, the resistance on at least an area of the surface of the laminate 2100 may be different from that on the other area of the surface of the laminate 2100. When the plating process is performed in a state in which the resistance is non-uniform, the plating process may be well performed on an area having relatively low resistance than an area having relatively high resistance to cause ununiformity in growth of the plating layer. Thus, to solve the above-described limitation, the surface resistance of the laminate 2100 has to be uniformly maintained. For this, the oxide having the crystalline or amorphous state may be dispersed on the surface of the laminate 2100 to form the insulation member. Here, the oxide may be partially distributed on the surface of the laminate 2100 or distributed on an entire surface of the laminate 2100 to form a layer shape. Alternatively, the oxide may be formed in the layer shape on at least one area and then partially distributed on at least one area. For example, the oxide may be distributed in an island shape on the surface of the laminate 2100 to form the insulation member 2700. That is, the oxide that is in the particle or melted state may be disposed to be spaced apart from each other and distributed in the island shape. Thus, at least a portion of the surface of the laminate 2100 may be exposed. Also, the oxide may be distributed on the entire surface of the laminate 2100, and the oxide that is in the particle or melted state may be connected to each other to form an oxide layer having a predetermined thickness. Here, since the oxide layer is formed on the surface of the laminate 2100, the surface of the laminate 2100 may not be exposed. Also, the oxide may be formed on the form of the layer on the at least one area and distributed in the island shape on at least a portion of the surface of the laminate 2100. That is, at least two oxides may be connected to each other to form the layer on at least one area and the island shape on at least one area. Thus, at least a portion of the surface of the laminate 2100 may be exposed. The total area of the insulation member 400, which is made of the oxide distributed in the island shape on the at least a portion of the surface of the laminate 2100 may be, for example, 10% to 90% of the total area of the surface of the laminate 10. Here, at least one oxide may be used as the oxide, which is in the particle or molten state, for realizing the uniform surface resistance of the laminate 2100. For example, at least one of $Bi_2O_3$, $BO_2$, $B_2O_3$, ZnO, $Co_3O_4$, $SiO_2$, $Al_2O_3$, MnO, $H_2BO_3$, $Ca(CO_3)_2$, $Ca(NO_3)_2$, and $CaCO_3$ may be used as the oxide.

2.8. Constituent of Internal Electrode and Discharge Electrode

The internal electrodes 201 to 208 of the capacitor parts 2200 and 2400 and the discharge electrodes 311 and 312 of the ESD protection part 2300 may be made of the conductive material, for example, a metal such as Ag, Al, Cu, Cr, Ni, Mo, or an alloy thereof. That is, each of the internal electrodes 201 to 208 and the discharge electrode 310 may be made of one metal or at least two metal alloys. Alternatively, each of the internal electrodes 201 to 208 and the discharge electrode 310 may be made of metal oxide or metal nitride having conductivity. Each of the internal electrodes 201 to 208 and the discharge electrode 310 may be formed by applying paste of a metal, a metal alloy or a metal compound. Also, the discharge electrode 310 may be formed through a deposition method such as sputtering and CVD. Also, each of the internal electrodes 201 to 208 and the discharge electrode 310 may contain a component for forming the laminate 2100. That is, each of the internal electrodes 201 to 208 and the discharge electrode 310 may contain a component for forming the insulation sheet 100 as well as the conductive material. That is, each of the internal electrodes 201 to 208 and the discharge electrode 310 may be formed by using a conductive material including at lest one of dielectric material powder such as MLCC, $BaTiO_3$, $BaCO_3$, $TiO_2$, $Nd_2O_3$, $Bi_2O_3$, ZnO, and $Al_2O_3$. Here, the component of the laminate, i.e., the component of the insulation sheet may contact at a ratio 20% in the conductive material. For example, when a mixture of the component of the insulation sheet and the conductive material is 100, the component of the insulation sheet may contact a ratio of approximately 1 to approximately 20. As described above, since the component of the insulation sheet is contained, each of the internal electrodes 201 to 208 and the discharge electrode 310 may have shrinkage similar to that of the laminate 2100. Thus, coupling force between the electrodes and the insulation sheet 100 may be improved.

2.9. Thickness of Capacitor Part and ESD Protection Part

Here, a distance between the ESD protection part 2300 and each of the capacitor parts 2000 and 4000 may be less than or equal to that between the two internal electrodes within the capacitor parts 2000 and 4000. That is, each of the fifth and seventh insulation sheets 105 and 107 disposed between the ESD protection part 2300 and each of the capacitor parts 2000 and 4000 may have a thickness less than or equal to that of each of the insulation sheets 102 to 104 and 107 to 110 disposed between the internal electrodes 200 within the capacitor parts 2000 and 4000. Also, a distance between the ESD protection part 2300 and each of the capacitor parts 2000 and 4000 may be less than or equal to that between the two discharge electrodes 310 of the ESD protection part 2300. That is, each of the fifth and seventh insulation sheets 105 and 107 disposed between the ESD protection part 2300 and each of the capacitor parts 2000 and 4000 may have a thickness less than or equal to that of the sixth insulation sheet 106 on which the ESD protection layer 320 is disposed. As a result, each of the fifth and seventh insulation sheets 105 and 107 disposed between the ESD protection part 2300 and each of the capacitor parts 2000 and 4000 may have a thickness less than or equal to that of each of the insulation sheets 102 to 104 and 107 to 110 disposed between the internal electrodes 200 within the capacitor parts 2000 and 4000 or have a thickness less than or equal to the distance B between the two discharge electrodes 310 of the ESD protection part 2300. That is, if distances between the ESD protection part 2300 and the capacitor parts 2000 and 4000 are A1 and A2, distance between the two internal electrodes within the capacitor parts 2000 and 4000 are C1 and C2, and a distance between the two discharge electrodes 300 of the ESD protection part 2300 is B, the following equation, which is expressed by $A1=A2 \leq C1=C2$ or $A1=A2 \leq B$, may be satisfied. Alternatively, the distance A1 may be different from the distance A2, and the distance C1 may be different from the distance C2. Each of the lowermost insulation sheet and the uppermost insulation sheet, i.e., the first and eleventh insulation sheet 101 and 111 may have a thickness that is greater than 10 μm and corresponds to 50% or less of the thickness of the laminate 2100. Here, when the first and eleventh insulation sheets 101 and 111 have thicknesses D1 and D2, respectively, the following equation that is expressed by B≤D1=D2, may be satisfied, where the thickness D1 may be different from the thickness D2.

Although the ESD protection part 2300 including one ESD protection layer 320 within the laminate 2100 is provided in accordance with an exemplary embodiment, two or more EDS protection layers 320, i.e., a plurality of ESD protection layers may be provided, and the ESD protection part 2300 may be provided in plurality. For example, at least two ESD protection layers 320 may be vertically disposed, and the discharge electrode may be further disposed between the ESD protection layers 320 so that one electric shock prevention part 2000 may be constituted by at least one capacitor part and at least two ESD protection parts. Also, the internal electrodes 200 of the capacitor parts 2000 and 4000 and the discharge electrode 310 and the ESD protection layer 320 of the ESD protection part 2300 may be provided in at least two or more in the Y-direction. Thus, a plurality of electric shock prevention parts 2000 may be provided in parallel to each other within one laminate 2100.

Figure 6:
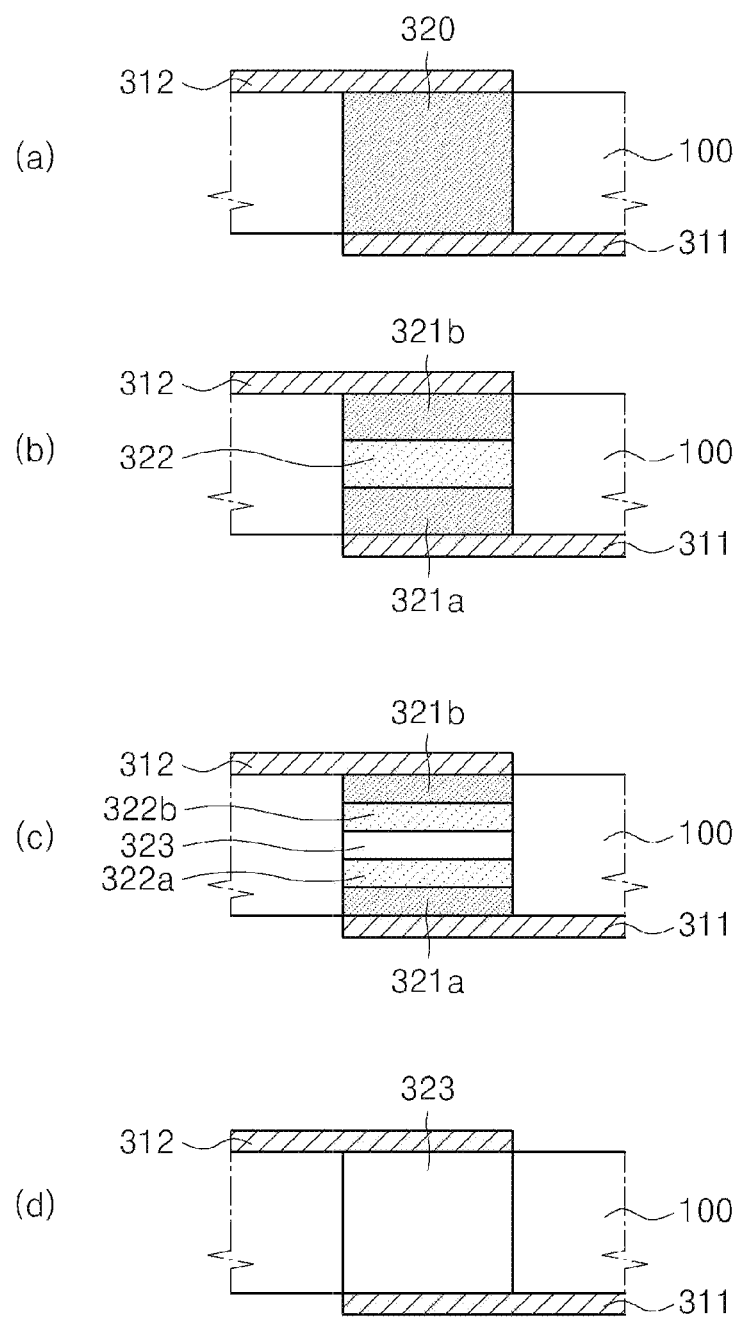
FIG. 6 is a partial cross-sectional view illustrating the electric shock prevention part of the contactor in accordance with an exemplary embodiment.

FIG. 6 is a partial cross-sectional view illustrating the electric shock prevention part of the contactor in accordance with an exemplary embodiment.

As illustrated in (a) of FIG. 6, the ESD protection layer 320 may be formed by mixing a conductive material with an insulation material. That is, the ESD protection material in which the conductive material and the insulation material are mixed may be applied to or filled into at least a portion of a through hole formed in at least one sheet 100 to form the ESD protection layer 320. For example, the ESD protection layer 320 may be formed by using the ESD protection material in which the conductive ceramic and the insulation ceramic are mixed. In this case, the ESD protection layer 320 may be formed by mixing the conductive ceramic with the insulation ceramic at a mixing ratio of, for example, 10:90 to 90:10. The more the mixing ratio of the insulation ceramic increases, the more the discharge starting voltage increases. Also, the more the mixing ratio of the conductive ceramic increases, the more the discharge starting voltage decreases. Thus, the mixing ratio of the conductive ceramic and the insulation ceramic may be adjusted to obtain a predetermined discharge starting voltage. Here, a plurality of pores (not shown) may be formed in the ESD protection layer 320. That is, since the ESD protection layer 320 uses the porous insulation material, the plurality of pores may be formed. Since the pores are formed, the ESD voltage may be more easily bypassed to the ground terminal.

Also, the ESD protection layer 300 may have a predetermined laminated structure in which the conductive layer and the insulation layer are laminated. That is, the conductive layer and the insulation layer may be laminated at least once so as to be separated from each other, thereby forming the ESD protection layer 300. For example, the ESD protection layer 320 may have a two-layered structure in which the conductive layer and the insulation layer are laminated or a three-layered structure in which the conductive layer, the insulation layer, and the conductive layer are laminated. Also, the conductive layer 321 and the insulation layer 322 may be laminated several times to form an at least three-layered structure. For example, as illustrated in (b) of FIG. 6, an ESD protection layer 300 having a three-layered structure in which a first conductive layer 321a, an insulation layer 322, and a second conductive layer 321b are laminated may be formed. (b) of FIG. 6 illustrates a photograph of the ESG protection layer having the three-layered structure between the internal electrodes that are disposed between the insulation sheets. When the conductive layer and the insulation layer are laminated several times, the conductive layer may be disposed at the uppermost layer and the lowermost layer. Here, a plurality of pores (not shown) may be formed in at least a portion of each of the conductive layer 321 and the insulation layer 322. For example, since the insulation layer disposed between the conductive layers 321 has a porous structure, the plurality of pores may be formed in the insulation layer 322.

Also, a void may be further formed in a predetermined area of the ESD protection layer 320. For example, a void may be formed between the layers in which the conductive material and the insulation material are mixed or formed between the conductive layer and the insulation layer. That is, a first mixed layer in which the conductive layer and the insulation material are mixed, a void, and a second mixed layer may be laminated, or the conductive layer, a void, and an insulation layer may be laminated. For example, as illustrated in (c) of FIG. 6, a first conductive layer 321a, a first insulation layer 322a, a void 323, a second insulation layer 322b, and a second conductive layer 321b may be laminated to form the ESD protection layer 320. That is, the insulation layers 322 may be disposed between the conductive layers 321, and the void may be formed between the insulation layers 322. Alternatively, the conductive layer, the insulation layer, and the void may be repeatedly laminated to form the ESD protection layer 320. When the conductive layer 321, the insulation layer 322, and the void 323 are laminated, the conductive layer 321, the insulation layer 322, and the void 323 may have the same thickness, or at least one of the conductive layer 321, the insulation layer 322, and the void 323 may have a thickness less than those of other components. For example, the void 323 may have a thickness less than that of each of the conductive layer 321 and the insulation layer 322. Also, the conductive layer 321 may have the same thickness as the insulation layer 322 or have a thickness greater or less than that of the insulation layer 322. A firing process is filled may be performed after a polymer material, and then, the polymer material may be removed to form the void 323. For example, a first polymer material containing the conductive ceramic, a second polymer material containing the insulation ceramic, and a third polymer material in which the conductive ceramic or the insulation ceramic is not contained may be filled into a via hole, and then, the firing process is performed to remove the polymer material, thereby forming the conductive layer, the insulation layer, and the void. The void 323 may be formed without being separated from the other layer. For example, the insulation layer 322 may be disposed between the conductive layers 321a and 321b, and a plurality of voids are vertically or horizontally connected to the inside of the insulation layer 322 to form the void 323. That is, the void 323 may be provided as a plurality of pores within the insulation layer 322. Alternatively, the void 323 may be formed in the conductive layer 321 as the plurality of pores.

Also, in the ESD protection layer 320, the ESD protection material containing the porous insulation material and the conductive material may be applied to a portion of the hole, but not applied to other portions to form the void. Alternatively, in the ESD protection layer 320, the ESD protection material may not be formed in the through hole, but the void 323 may be formed between the two discharge electrodes 311 and 312 as illustrated in (d) of FIG. 6.

The conductive layer 321 used for the ESD protection layer 320 may have predetermined resistance to allow current to flow. For example, the conductive layer 321 may be a resistor having resistance of several $\Omega$ to several tens M$\Omega$. The conductive layer 321 may reduce an energy level when a voltage such as the ESD is excessively introduced to prevent the electric shock prevention part from being structurally broken by the overvoltage. That is, the conductive layer 321 may function as a heat sink that coverts electric energy into heat energy. The conductive layer 321 may be formed by using conductive ceramic. The conductive ceramic may use a mixture containing at least one of La, Ni, Co, Cu, Zn, Ru, Ag, Pd, Pt, W, Fe, and Bi. Also, the conductive layer 321 may have a thickness of 1 µm to 50 µm. That is, when the conductive layer 321 are provided as a plurality of layers, the sum of the thicknesses of the conductive layers 321 may be 1 µm to 50 µm.

Also, the insulation layer 322 used for the ESD protection layer 320 may be formed f a discharge inducing material to function as an electric barrier having a porous structure. The insulation layer 322 may be made of insulation ceramic, and a ferroelectric material having a dielectric constant of approximately 50 to approximately 50,000 may be used as the insulation ceramic. For example, the insulation ceramic may be formed by using a mixture containing at least one of dielectric material powder such as MLCC, $SiO_2$, $Fe_2O_3$, $Co_3O_4$, $BaTiO_3$, $BaCO_3$, $TiO_2$, Nd, Bi, Zn, and $Al_2O_3$. The insulation layer 322 may have a porous structure in which a plurality of pores, each of which has a size of approximately 1 nm to approximately 30 µm, are formed to have porosity of 30% to 80%. Here, the shortest distance between the pores may be approximately 1 nm to approximately 50 µm. That is, in the insulation layer 322, the more the porosity increases, the more a distance between the pores may decrease, and the more the pore increases in size, the more the distance between the pores may decrease. Although the insulation layer 322 is made of an electrical insulation material through which current does not flow, since the pores are formed, the current may flow through the pores. Here, when the pore increases in size, or the porosity increases, the discharge starting voltage may decrease. On the other hand, when the pore decreases in size, or the porosity decreases, the discharge starting voltage may increase. However, if the size of the pore exceeds 30 µm, or the porosity exceeds 80%, it may be difficult to maintain the configuration of the ESD protection layer 320. Thus, to maintain the configuration of the ESD protection layer 320, the discharge starting voltage may be adjusted to adjust the size of the pore and the porosity of the insulation layer 322. When the ESD protection layer 320 is made of the mixed material of the insulation material and the conductive material, the insulation material may use the insulation ceramic having fine pores and porosity. Also, the insulation layer 322 may have resistance less than that of the insulation sheet 100 by the fine pores, and partial discharge may be performed through the fine pores. That is, the fine pores are formed in the insulation layer 322, and thus, the partial discharge is performed through the fine pores. The insulation layer 322 may have a thickness of 1 µm to 50 µm. That is, when the insulation layer 322 are provided as a plurality of layers, the sum of the thicknesses of the insulation layers 322 may be 1 µm to 50 µm.

As described above, the contactor in accordance with an exemplary embodiment may be disposed between the metal case 10 such as the metal case of the electronic device and the internal circuit 20 coming into contact with the user as illustrated in FIG. 1. That is, one of the external electrodes 2600 may be connected to the ground terminal of the internal circuit 20, and the other one may be connected to the contact part 1000 connected to the conductor 10. For example, the first external electrode 2610 may be connected to the ground terminal of the internal circuit 20, and the second external electrode 2620 may extend upward and be connected to the contact part 1000 connected to the conductor 10 of the electronic device. Here, an area of the internal circuit 20 coming into contact with the second external electrode 2620 may be maintained in the insulated state. Thus, the contactor in accordance with an exemplary embodiment may be maintained in the insulated state at a voltage less than the discharge starting voltage to block the electric shock voltage transmitted from the ground terminal of the internal circuit 20 to the conductor 10 and be conducted at a voltage greater than the discharge starting voltage to bypass the ESD voltage applied to the internal circuit 20 through the conductor 10 from the outside to the ground terminal. That is, in the electric shock prevention part 2000, current does not flow between the external electrodes 2600 at a rated voltage and the electric shock voltage, but flows through the ESD protection part 2300 at the ESD voltage to allow the ESD voltage to be bypassed to the ground terminal. In the electric shock prevention part 2000, the discharge starting voltage may be greater than a rated voltage and less than the ESD voltage. For example, in the electric shock prevention part 2000, the rated voltage may be 100 V to 240 V, the electrical shock voltage may be equal to or greater than an operation voltage of the circuit, and the ESD voltage generated by external static electricity may be greater than the electric shock voltage. Here, the discharge starting voltage may be 350 V to 15 kV. Also, a communication signal may be transmitted between the outside and the internal circuit 20 by the capacitor parts 2200 and 2400. That is, the communication signal from the outside, e.g., an RF signal may be transmitted to the internal circuit 20 by the capacitor parts 2200 and 2400, and the communication signal from the internal circuit 20 may be transmitted to the outside by the capacitor parts 2200 and 2400. Event when the conductor 10 is used as an antenna without providing a separate antenna, the communication signal may be transmitted to and received from the outside by using the capacitor parts 2200 and 2400. Also, since each of the capacitor parts 2200 and 2400 serves as an antenna, the electric shock prevention part may function as and be substituted for, for example, a capacitor that is used for antenna matching of a communication frequency in the mobile communication device having a frequency of 700 MHz or more. That is, the electric shock prevention part may be substituted for or combined with a capacitor that is used in a circuit constituting a communication antenna in a frequency band of 700 MHz or more. That is to say, the electric shock prevention part may provided capacitance that is required for the circuit constituting the communication antenna in the frequency band of 700 MHz or more. As a result, the electric shock prevention part in accordance with an exemplary embodiment may block the electric shock voltage applied from the ground terminal of the internal circuit and bypass the ESD voltage applied from the outside to the ground terminal to transmit the communication signal between the outside and the electronic device. Also, the electric shock prevention part 2000 may be disposed between the contact part 100 and the internal circuit 20 to perform DC blocking and AC coupling between the contact part 1000 and the internal circuit 20, and thereby to prevent the internal circuit from being broken by a voltage that corresponds to 1 time to 1.5 times of the ESD or an external voltage. Here, the external voltage may be a rated voltage of a domestic voltage or an output voltage of a charger and may include a normal voltage or abnormal voltage.

Also, in the contactor in accordance with an exemplary embodiment, the plurality of insulation sheets, each of which has a high resistance property, may be laminated to form the capacitor part. Thus, when an electric shock voltage of 310 V is introduced from the internal circuit to the conductor 10 such as the metal case by the faulty charger, the insulation resistance state may be maintained to prevent leakage current from flowing. Also, when the ESD voltage is introduced into the internal circuit 20 from the conductor 10, the ESD protection part may bypass the ESD voltage to maintain the high insulation resistance state without damaging the device. That is, the ESD protection part 2300 may include the ESD protection layer 320 including the conductive layer 321 that reduces the energy level to convert the electric energy into the heat energy and the insulation layer 322 having the porous structure to allow the current to flow through the fine pores to bypass the ESD voltage applied from the outside, thereby protecting the circuit. Thus, the ESD protection part 300 may be disposed in the electronic device including the metal case to continuously prevent the electric shock generated in the faulty charger from being transmitted to the user through the metal case of the electronic device without dielectric breakdown. A general multilayer capacitance circuit (MLCC) may protect the electric shock voltage, but be weak to the ESD. Thus, when the ESD is repeatedly applied, spark may occur by a leak point due to the electric charging to damage the device. However, since the ESD protection layer including the conductive layer and the insulation layer is disposed between the capacitor parts in accordance with an exemplary embodiment, the ESD voltage may be bypassed through the ESD protection layer so that the capacitor parts are not broken.

Figure 7:
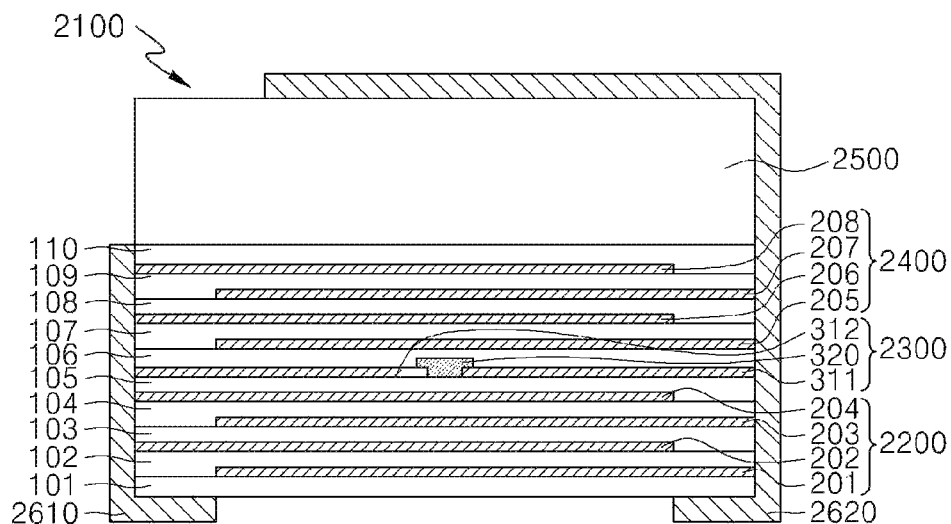
FIGS. 7 to 12 are cross-sectional views illustrating an electric shock prevention part of a contactor in accordance with further other exemplary embodiments.

In the electric shock prevention part 2000 in accordance with an exemplary embodiment, the ESD protection material is filled into or applied to the through hole formed in the insulation sheet 106 to form the ESD protection layer 320. However, the ESD protection layer 320 may be disposed on a predetermined area of the insulation sheet, and the discharge electrode 310 may be disposed to contact the ESD protection layer 320. That is, as illustrated in a cross-sectional view in accordance with another exemplary embodiment of FIG. 7, two discharge electrodes 311 and 312 may be horizontally spaced apart from each other on an insulation sheet 106, and an ESD protection layer 320 may be disposed between the two discharge electrodes 311 and 312. Here, since each of first and second capacitor parts 2200 and 2400 and an external electrode 2500 have the same configuration as that in accordance with an exemplary embodiment, their detailed descriptions will be omitted, and duplicated descriptions of an ESD protection part 2300 may also be omitted.

The ESD protection part 2300 may include at least two discharge electrodes 311 and 312 that are horizontally spaced apart from each other and at least one ESD protection layer 320 disposed between the at least two discharge electrodes 311 and 312. That is, the two discharge electrodes 311 and 312 may be disposed in a direction in which the two discharge electrodes 311 and 312 are spaced apart from each other on a predetermined area, e.g., a central portion of the sheet in a direction in which the external electrode 2500 is disposed, i.e., in the X-direction. Also, at least two discharge electrodes (not shown) may be further disposed in directions perpendicular to each other. Thus, at least one discharge electrode may be disposed in a direction perpendicular to that in which the external electrode 2500 is disposed, and at least one discharge electrode may be disposed to be spaced a predetermined distance from each other to face each other. For example, as illustrated in FIG. 26, the ESD protection part 2300 may include a sixth insulation sheet 106, first and second discharge electrodes 311 and 312 spaced apart from each other on the sixth insulation sheet 106, and an ESD protection layer 320 disposed on the sixth insulation sheet 106. Here, the ESD protection layer 320 may have at least a portion connected to the first and second discharge electrodes 311 and 312. The first discharge electrode 311 may be connected to an external electrode 5100 and disposed on the sixth insulation sheet 106 and have an end connected to the ESD protection layer 320. The second discharge electrode 312 be connected to an external electrode 5200 and spaced apart from the first discharge electrode 311 on the sixth insulation sheet 106 and have an end connected to the ESD protection layer 320. Alternatively, at least one discharge electrode may be further disposed in a direction perpendicular to that in which the discharge electrode is spaced apart from the first and second discharge electrodes 311 and 322, and the external electrode 2500 is disposed. The ESD protection layer 320 may be disposed on a predetermined area, e.g., a central portion of the sixth insulation sheet 106 and connected to the first and second discharge electrodes 311 and 312. Here, the ESD protection layer 320 may partially overlap each of the first and second discharge electrodes 311 and 312. The ESD protection layer 320 may be disposed on the sixth insulation sheet 106 that is exposed between the first and second discharge electrodes 311 and 312 and connected to a side surface of each of the first and second discharge electrodes 311 and 312. However, in the case, since the ESD protection layer 320 does not contact the first and second discharge electrodes 311 and 312 without being spaced apart from the first and second discharge electrodes 311 and 312, the ESD protection layer 320 may be disposed to overlap the first and second discharge electrodes 311 and 312. Also, the ESD protection layer 300 may have the same thickness as each of the first and second discharge electrodes 311 and 312 or have a thickness greater than that of each of the first and second discharge electrodes 311 and 312. For example, the ESD protection layer 320 may have a diameter of 100 μm to 500 μm and a thickness of 10 μm to 50 μm.

Figure 8:
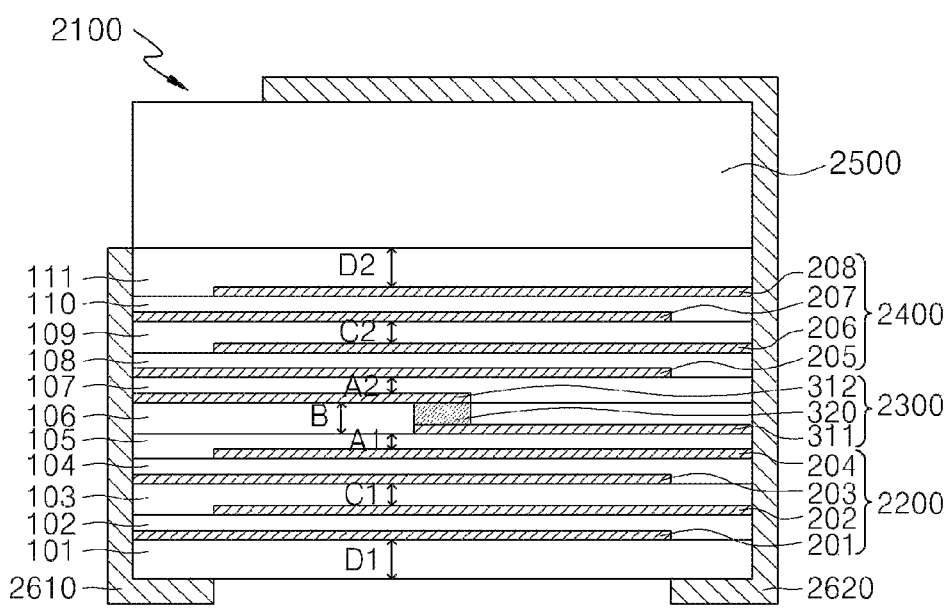

FIG. 8 is a cross-sectional view of an electric shock prevention part in accordance with further another exemplary embodiment.

Referring to FIGS. 8 to 11, an electric shock prevention part in accordance with further another exemplary embodiment may include a laminate 1000 in which a plurality of insulation sheets 100 (101 to 111) are laminated, at least one capacitor part 2200 and 2400 disposed in the laminate 1000 and including a plurality of internal electrodes 200 (201 to 208), an ESD protection part 2300 including at least one discharge electrode 310 and an ESD protection layer 320, and external electrodes 2500 (5100 and 5200) respectively disposed on two side surfaces facing each other of the laminate 1000 and connected to the first and second capacitor parts 2200 and 2400 and the ESD protection part 2300.

Here, distances A1 and A2 between the ESD protection part 2300 and the capacitor parts 2200 and 2400 may be less than or equal to that C1 or C2 between the two internal electrodes within each of the capacitor parts 2200 and 2400. That is, each of the fifth and seventh insulation sheets 105 and 107 disposed between the ESD protection part 2300 and each of the capacitor parts 2200 and 2400 may have a thickness less than or equal to that of each of the insulation sheets 102 to 104 and 107 to 110 disposed between the internal electrodes 200 within the capacitor parts 2200 and 2400. Also, the distances A1 AND A2 between the ESD protection part 2300 and the capacitor parts 2200 and 2400 may be less than or equal to that B between the two discharge electrodes 310 of the ESD protection part 2300. That is, each of the fifth and seventh insulation sheets 105 and 107 disposed between the ESD protection part 2300 and each of the capacitor parts 2200 and 2400 may have a thickness less than or equal to that of the sixth insulation sheet 106 on which the ESD protection layer 320 is disposed. As a result, each of the fifth and seventh insulation sheets 105 and 107 disposed between the ESD protection part 2300 and each of the capacitor parts 2200 and 2400 may have a thickness less than or equal to that of each of the insulation sheets 102 to 104 and 107 to 110 disposed between the internal electrodes 200 within the capacitor parts 2200 and 2400 or have a thickness less than or equal to the distance B between the two discharge electrodes 310 of the ESD protection part 2300. That is, the distances A1 and A2 between the ESD protection part 2300 and the capacitor parts 2200 and 2400, the distance C1 and C2 between the two internal electrodes within the capacitor parts 2200 and 2400, and the distance B between the two discharge electrodes 300 of the ESD protection part 2300 may satisfy the following equation: $A1=A2\leq C1=C2$ or $A1=A2\leq B$. Alternatively, the distance A1 may be different from the distance A2, and the distance C1 may be different from the distance C2. The lowermost insulation sheet and the uppermost insulation sheet, i.e., the first and eleventh insulation sheet 101 and 111 may have thickness D1 and D2 that are greater than 10 μm and corresponds to 50% or less of the thickness of the laminate 1000. Here, the equation may be $B\leq D1=D2$, the thickness D1 may be different from the thickness D2.

Also, in the electric shock prevention part in accordance with further another embodiment, two internal electrodes adjacent to the discharge electrodes 311 and 312, i.e., the fourth and fifth internal electrodes 204 and 205 may be connected to the discharge electrodes 311 and 312 and the same external electrode 2500. That is, the first, third, fifth, and seventh internal electrodes 201, 203, 205, and 207 may be connected to the second external electrode 5200, and the second, fourth, sixth, and seventh internal electrodes 202, 204, 206, and 208 may be connected to the first external electrode 5100. Also, the first discharge electrode 311 may be connected to the first external electrode 5100, and the second discharge electrode 312 may be connected to the second external electrode 5200. Thus, the first discharge electrode 311 and the fourth internal electrode 204 adjacent to the first discharge electrode 311 may be connected to the first external electrode 5100, and the second discharge electrode 312 and the fifth internal electrode 205 adjacent to the second discharge electrode 312 may be connected to the second external electrode 5200.

As described above, since the discharge electrode 310 and the internal electrode 200 adjacent to the discharge electrode 310 are connected to the same external electrode 2500, although degradation of the insulation sheet 100, i.e., the insulation breakdown occurs, the ESD voltage may not be applied to the inside of the electronic device. That is, when the discharge electrode 310 and the internal electrode 200 adjacent to the discharge electrode 310 are connected the external electrodes 2500 different from each other, if the insulation breakdown of the insulation sheet 100 occurs, the ESD voltage applied through one external electrode 2500 may flow to the other external electrode 2500 through the discharge electrode 310 and the internal electrode 200 adjacent to the discharge electrode 310. For example, as illustrated in FIG. 8, when the first discharge electrode 311 is connected to the first external electrode 5100, and the fourth internal electrode 204 adjacent to the first discharge electrode 311 is connected to the second external electrode 5200, if the insulation breakdown of the insulation sheet 100 occurs, a conductive path may be formed between the first discharge electrode 311 and the fourth internal electrode 204 to allow the ESD voltage applied through the first external electrode 5100 to flow to the first discharge electrode 311, the insulation-broken fifth insulation sheet 105, and the second internal electrode 202. Thus, the ESD voltage may be applied to the internal circuit through the second external electrode 5200. To solve the above-described limitation, although the insulation sheet 100 has a thick thickness, in this case, the electric shock prevent part may increase in size. However, as illustrated in FIG. 8, since the discharge electrode 310 and the internal electrode 200 adjacent to the discharge electrode 310 are connected to the same external electrode 2500, although degradation of the insulation sheet 100, i.e., the insulation breakdown occurs, the ESD voltage may not be applied to the inside of the electronic device. Also, although the insulation sheet 100 does not have a thick thickness, the applying of the ESD voltage may be prevented.

The electric shock prevention part may have various sizes according to the size of the electronic device such as the smartphone. That is, as the electronic device such as the smartphone is miniaturized, the electric shock prevention part may decrease in size. Also, as the electronic device is multifunctionalized, the electric shock prevention part may increase in size. For example, the electric shock prevention part in accordance with exemplary embodiments has a length L of 0.15 mm to 7.5 mm in one direction, i.e., the X-direction, a width W 0.15 mm to 7.5 mm in the other direction perpendicular to the one direction, i.e., the Y-direction, and a thickness of 0.15 mm to 7.5 mm in the Z-direction. For example, the length, the width, and the thickness of the electric shock prevention part may be 0.9 mm to 5.0 mm, 0.45 mm to 1.0 mm, and 0.25 mm to 5.0 mm, 0.55 mm to 1.75 mm, 0.25 mm to 0.35 mm, and 0.1 mm to 1.75 mm, and 0.3 mm to 1.75 mm, 0.15 mm to 0.25 mm, and 0.08 mm to 1.75 mm, respectively. For example, the length, the width, and the thickness of the electric shock prevention part may be 1.4 mm to 5.0 mm, 0.6 mm to 1.0 mm, and 0.3 mm to 5.0 mm, 1.8 mm to 7.0 mm, 1.0 mm to 1.4 mm, and 0.5 mm to 7.0 mm, and 1.8 mm to 7.5 mm, 0.9 mm to 1.5 mm, and 0.45 mm to 7.5 mm, respectively. Alternatively, the length, the width, and the thickness of the electric shock prevention part may be 2.6 mm to 7.5 mm, 1.3 mm to 1.9 mm, and 0.6 mm to 7.5 mm, 4.0 mm to 7.5 mm, 2.8 mm to 3.6 mm, and 1.4 mm to 7.5 mm, and 5.2 mm to 6.2 mm, 4.5 mm to 5.5 mm, and 2.0 mm to 5.5 mm, respectively. As described above, the electric shock prevention part may have a ratio of length:width:thickness of 1 to 5:1 to 5:1 to 5, for example, 2 to 5:1:0.5 to 5. That is, the electric shock prevention part may have the same width and height, which are greater than the height. For example, in the electric shock prevention part, the length may be greater by 2 times to 5 times than the width on the basis of the width, and the thickness may be greater by 0.5 times to 5 times than the width on the basis of the width. The dimension of the device may be based on the standard for the typical SMT device. Here, the ESD protection layer 320 may have, for example, a width of 50 μm to 1,000 μm and a thickness of 5 μm to 500 μm according to a size of the electric shock prevention part.

Particularly, the length×width×thickness of the electric shock prevention part may be reduced to the length×width× thickness of 1.0 mm×0.5 mm×0.5 mm (hereinafter, a first electric shock prevention part), 0.6 mm×0.3 mm×0.3 mm (hereinafter, a second electric shock prevention part), and 0.4 mm×0.2 mm×0.2 mm (hereinafter, a third electric shock prevention part). That is, a plurality of rectangular sheets, each of which has a length of 1.0 mm and a width of 0.5 mm, may be laminated to manufacture a first electric shock prevention part having a thickness of 0.5 mm. Also, a plurality of rectangular sheets, each of which has a length of 0.6 mm and a width of 0.3 mm, may be laminated to manufacture a second electric shock prevention part having a thickness of 0.3 mm. Also, a plurality of rectangular sheets, each of which has a length of 0.4 mm and a width of 0.2 mm, may be laminated to manufacture a third electric shock prevention part having a thickness of 0.2 mm. Here, the sheets of the capacitor parts 2200 and 2400 of the electric shock prevention part may have a thickness 15 μm to 300 μm, preferably, 15 μm to 300 μm. The ESD protection layer 320 may have a width of 50 μm to 450 μm and a thickness of 5 μm to 50 μm.

For example, the length, the width, and the thickness of the electric shock prevention part may be manufactured with sizes of 1.6 mm×0.8 mm×0.5 mm, 2.0 mm×1.2 mm×0.6 mm, 3.0 mm×1.2 mm×0.6 mm, 3.2 mm×1.6 mm×0.6 mm, 4.5 mm×3.2 mm×1.2 mm, and 5.7 mm×5.0 mm×2.0 mm. That is, the length, width, and thickness may increase so that the electric shock prevention part increases in size than the first electric shock prevention part. Here, the sheets of the capacitor parts 2200 and 2400 of the electric shock prevention part may have a thickness 300 μm to 2,500 μm, preferably, 400 μm to 4,000 μm. The ESD protection layer 320 may have a width of 100 μm to 1000 μm and a thickness of 10 μm to 200 μm.

The electric shock prevention part may be reduced in size and thus reduced in dimension to reduce an area of the internal electrode also. The area of the internal electrode may be maintained in a range of 10% to 95% of the area of the sheet. However, even though the electric shock prevention part is reduced in size, a capacitance of the electric shock prevention part has to be maintained to 0.3 pF to 500 pF. That is, the first electric shock prevention part and the second and third electric shock prevention part, each of which has a size less than the first electric shock prevention part, have to have the same capacitance. To realize the second and third electric shock prevention part having the same capacitance as the first electric shock prevention part, i.e., in order that the dielectrics are reduced in thickness, or the sheets have a higher dielectric constant, a high-k material has to be used. The capacitance may be calculated by the following equation 1.

Capacitance=Air dielectric constant×Dielectric constant of material×Total overlapping area of internal electrode/Thickness of dielectric between internal electrodes [Equation 1]

In another method for realizing the same capacitance regardless of the size, the dielectric may be reduced in laminated thickness. However, the electric shock prevention part may have destruction tolerance with respect to the ESD voltage. For this, since a minimum thickness of the dielectric is required, it may be limited to reduce the laminated thickness of the dielectric so as to maintain the capacitance. Thus, to realize the same capacitance at a predetermined thickness or more, the high-k material has to be selected. If the high-k material is used, the area of the internal electrode has to be minimized, and the thickness of the dielectric has to be thick. However, since it is impossible to increase the thickness of the dielectric by the limitation in minimum printing area and the standard in thickness of the electric shock prevention part, it is difficult to use a too high-k material.

Thus, in the second and third electric shock prevention part, each of which has a relatively small size, the dielectric between the internal electrodes has a thickness of 15 μm to 300 μm, each of the internal electrodes has an area corresponding to 10% to 95% of the area of the plane within the size (i.e., 0.6 mm×0.3 mm or 0.4 mm×0.2 mm) of the device, an outer margin (i.e., a distance from an edge of the internal electrode to an edge of the dielectric) is 25 μm to 100 μm, and the dielectric has a dielectric constant of 200 to 3000 in the second electric shock prevention part and a dielectric constant of 600 to 3000 in the third electric shock prevention part. When the internal electrode has an area of 10% or less, the screen printing may have low resolution, and thus, distribution of the capacitance may be widened. When the internal electrode has an area of 95% or more, the printing area may be too wide, and thus, lamination defects such as surface protrusion of the internal electrode and dividedness defects such as delamination may occur to deteriorate reliability of the device.

When the sheets between the internal electrodes, i.e., the dielectric has a thick thickness, the capacitance may be lowered, and the laminated number in a limited space may be limited. Thus, it may be difficult to realize the capacitance that is suitable for the electric shock prevention part. On the other hand, the dielectric between the internal electrodes, i.e., the sheets may be reduced in thickness to increase the capacitance. Also, the sheets may be multiply laminated to increase the capacitance. However, the electric shock prevention part may satisfy a standard severe than ICE61000-4-2 Level 4 that is a regulation standard with respect to the ESD in reliability. Here, if the dielectric has a thickness of 15 μm or less on the basis of the test reference, when the ESD voltage is repeatedly applied, the insulation resistance of the dielectric may be broken in spite of the existence of the ESD protection part. The reason in which the insulation resistance of the dielectric is broken is because the ESD voltage is not bypassed to the ESD protection part during a period of blank from a time point at which the ESD voltage is introduced to a reaction time of the electric shock prevention part, and a voltage of 500 V or more is applied to the electric layer for a time of 1 ns to 30 ns, and thus, the resistance property of the dielectric is not endured and is broken.

If a chip size decreases, a design space may be reduced. Thus, an inner surface of the electric shock prevention part, which has high ESD resistance in a narrow space, is needed. However, when the electric shock prevention part is reduced in size, the insulation sheet may be thinner due to space shortage. Thus, the resistance property of the insulation sheet in itself may be reduced to prevent the insulation resistance of the insulation sheet from being broken even though the ESD having a low level is applied. To solve the above-described limitation, a floating type structure having various shapes may be used to improve the ESD resistance property within the same space when compared to the general tacking type structure. That is, since the internal electrode of the capacitor part is deformed in shape to increase the thickness of the insulation sheet twice or more in one region between the internal electrodes, the ESD resistance property may be maintained. Thus, the ESD resistance property may be more improved associated with the design of the ESD protection part of the electric shock prevention part. As a result, when the ESD is not bypassed to the ESD protection part due to the deterioration in function by the repeated ESD voltage of the ESD protection part, the capacitor part may be damaged to cause the insulation breakdown. Also, although the function of the ESD protection part is not deteriorated, when the ESD voltage is introduced, an ESD voltage load may temporarily occur in the capacitor part during the period of blank of 1 ns to 30 ns till the reaction time of the ESD protection part of the electric shock prevention part to cause the insulation breakdown. However, the capacitor part may be provided as the floating type to increase the ESD resistance property of the capacitor layer, thereby preventing the phenomenon in which the insulation resistance is broken to cause the short circuit from occurring.

Alternatively, when the first and second discharge electrodes 311 and 312 may be horizontally disposed to contact the ESD protection layer 320, at least one internal electrode of the capacitor parts 2200 and 2400 may be provided in the floating type.

The electric shock prevention part in accordance with exemplary embodiments may include at least one ESD protection layer 320 of the ESD protection part 3000. That is, one ESD protection layer 300 may be disposed in the direction in which the external electrode is disposed, and two or more ESD protection layers 320 or plurality of ESD protection layers 320 may be disposed in the direction in which the external electrode is disposed. Here, the plurality of ESD protection layers 320 may be disposed in a direction perpendicular to the above-described direction. For example, two ESD protection layers may be disposed on the same plane, or three ESD protection layers may be disposed on the same plane. At least two or more ESD protection layers may be connected to each other by the discharge electrode. Also, four ESD protection layers may be vertically disposed by dividing two ESD protections into upper and lower sides, and six ESD protection layers may be vertically disposed by dividing three ESD protection layers into upper and lower sides. In the ESD protection layers 320 that are vertically spaced apart from each other, upper ESD protection layers may be connected to each other, and lower ESD protection layers may be connected to each other. When the plurality of ESD protection layers 320 are provided, the ESD protection layers 320 may have the same structure or structures different from each other.

Also, the electric shock prevention part in accordance with an exemplary embodiment may include a plurality of capacitor parts 2200 and 2400 and a plurality of ESD protection parts 2300, which are horizontally disposed in the laminate 1000. That is, at least one capacitor part 2200 and 2400 and an ESD protection part 2300, which are vertically laminated, may be horizontally arranged in at least two rows and connected to at least two external electrodes 2500 that are horizontally arranged. Thus, the plurality of electric shock prevention parts, each of which includes the plurality of capacitor parts and ESD protection parts may be disposed in parallel to each other. Therefore, two or more electric shock prevention parts may be provided in one laminate 1000. In the plurality of capacitor parts, at least one internal electrode may have a different length. That is, at least one internal electrode of the plurality of internal electrodes that are horizontally disposed to respectively constitute capacitor parts different from each other may have a length less than that of the other internal electrode. Also, at least one of an overlapping area of the internal electrodes and the laminated numbers of internal electrodes in addition to the length of the internal electrode may be adjusted to adjust the capacitance. Thus, at least one of the plurality of capacitor parts may have a different capacitance. That is, at least one capacitor part within one laminate may realize the plurality of capacitor parts having capacitances different from each other.

Figure 9:
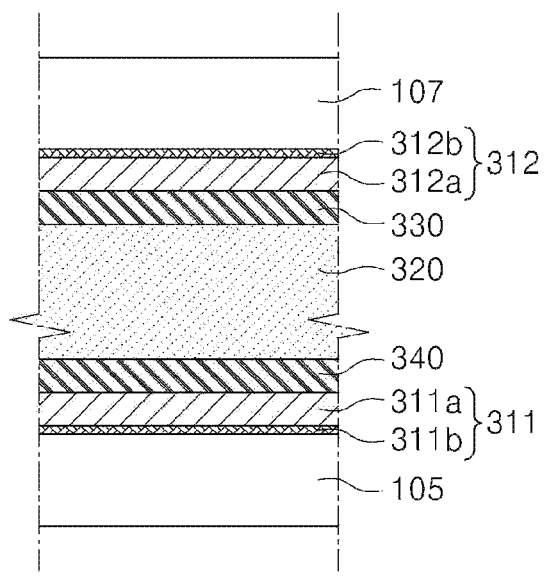
Figure 10:
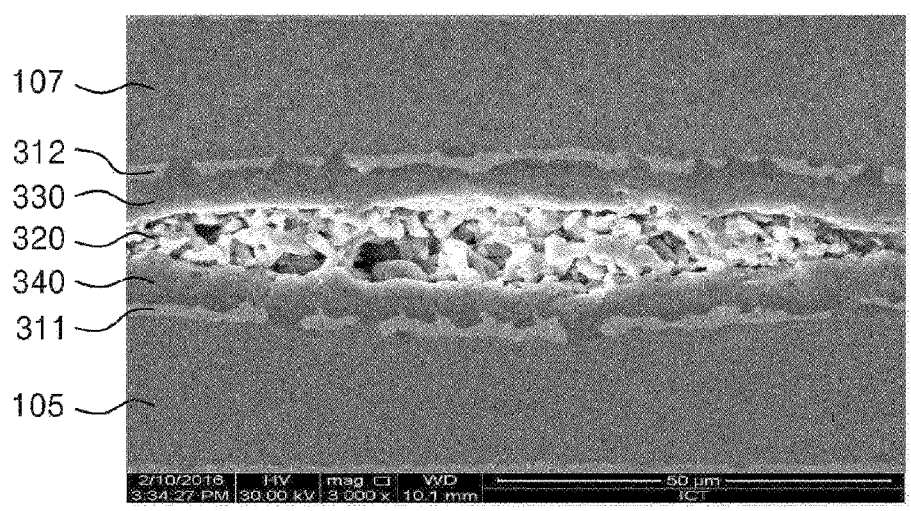
Figure 13:
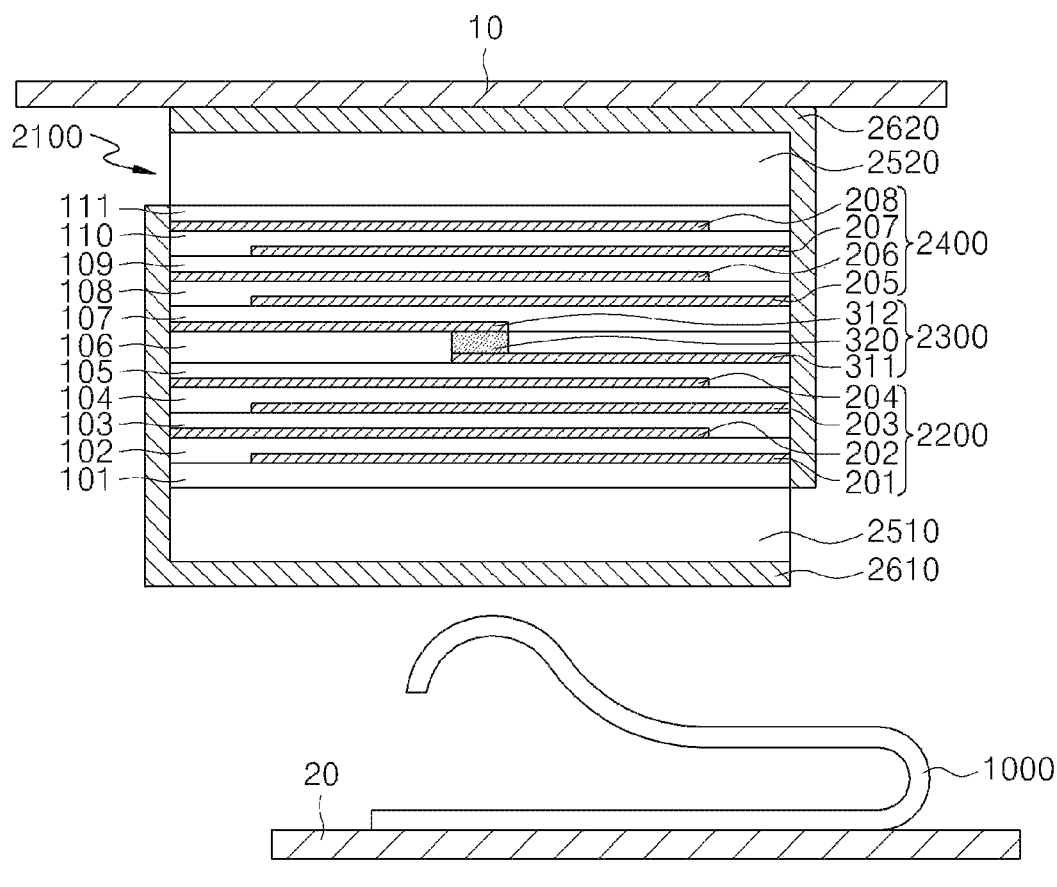
FIG. 13 is a cross-sectional view of a contactor in accordance with another exemplary embodiment.

As illustrated in FIGS. 9 and 10, the ESD protection part 3000 may include at least two discharge electrodes 310, an ESD protection layer 320 disposed between the discharge electrodes 310, and a discharge induction layer 330 disposed between the discharge electrodes 310 and the ESD protection layer 320. That is, the discharge induction layer 330 may be further disposed between the discharge electrodes 310 and the ESD protection layer 320. Here, the discharge electrode 310 may include conductive layers 311a and 312a and porous insulation layers 311b and 312b formed on at least one surface of the conductive layers 311a and 312a. Alternatively, the discharge electrode 310 may be a conductive layer in which the porous insulation layer is not formed on a surface thereof. The discharge induction layer 330 may be formed when the ESD protection layer 320 is formed by using the porous insulation material. Here, the discharge induction layer 330 may be formed as a dielectric layer having density greater than that of the ESD protection layer 320. That is, the discharge induction layer 330 may be made of the conductive material or the insulation material. For example, when the ESD protection layer 320 is formed by using porous ZrO, and the discharge electrode 310 is formed by using Al, the discharge induction layer 330 made of AlZrO may be formed between the ESD protection layer 320 and the discharge electrode 310. TiO instead of ZrO may be used for forming the ESD protection layer 320. In this case, the discharge induction layer 330 may be formed of TiAlO. That is, the discharge induction layer 330 may be formed by reaction between the discharge electrode 310 and the ESD protection layer 320. Alternatively, the discharge induction layer 330 may be formed by additional reaction of the insulation sheet 100. In this case, the discharge induction layer 330 may be formed by reaction between a discharge electrode material (e.g., Al), an ESD protection layer material (e.g., ZrO), and an insulation sheet material (e.g., $BaTiO_3$). Also, the discharge induction layer 330 may be formed by reaction with a material of the insulation sheet 100. That is, the discharge induction layer 330 may be formed through the reaction between the ESD protection layer 320 and the insulation sheet 100 in a region in which the ESD protection layer 320 contacts the insulation sheet 100. Thus, the discharge induction layer 330 may surround the ESD protection layer 320. Here, the discharge induction layer 330 between the ESD protection layer 320 and the discharge electrode 310 may have a composite different from that of the discharge induction layer 330 between the ESD protection layer 320 and the insulation sheet 100. The discharge induction layer 330 may be formed by removing at least one region thereof. Here, the at least one region may have a thickness different from that of the other region thereof. That is, at least one region of the discharge induction layer 330 may be removed to form a non-continuous shape. That is, the discharge induction layer 330 may be non-uniform in thickness, for example, have a different thickness in at least one region. The discharge induction layer 330 may be formed during the firing process. That is, when the firing process is performed at a predetermined temperature, the discharge electrode material and the ESD protection material may be mutually diffused to form the discharge induction layer 330 between the discharge electrode 310 and the ESD protection layer 320. The discharge induction layer 330 may have a thickness corresponding to 10% to 70% of the thickness of the ESD protection layer 320. That is, a portion of the thickness of the ESD protection layer 320 may be changed into the discharge induction layer 330. Thus, the discharge induction layer 330 may have a thickness less than that of the ESD protection layer 320 and a thickness greater than, equal to, or less than that of the discharge electrode 310. The ESD voltage may be induced to the ESD protection layer 320 by the discharge induction layer 330 or reduce a level of discharge energy induced to the ESD protection layer 320. Thus, the ESD voltage may be more easily discharged to improve the discharge efficiency. Also, since the discharge induction layer 330 is formed, a heterogeneous material may be prevented from being diffused to the ESD protection layer 320. That is, the diffusion of the insulation sheet material and the discharge electrode material to the ESD protection layer 320 may be prevented, and the diffusion of the ESD protection material to the outside may be prevented. Thus, the discharge induction layer 330 may be used as a diffusion barrier to prevent the ESD protection layer 320 from being broken down. The ESD protection layer 320 may further include a conductive material. In this case, the conductive material may be coated with insulation ceramic. For example, when the ESD protection layer 320 is formed by mixing the porous insulation material with the conductive material, the conductive material may be applied by using NiO, CuO, WO, and the like. Thus, the conductive material may be used as the material for the ESD protection layer 320 together with the porous insulation material. Also, when the conductive material is used for the ESD protection layer 320 in addition to the porous insulation material, for example, when the insulation layer 322 is formed between the two conductive layers 321a and 321b, the discharge induction layer 330 may be formed between the conductive layer 321 and the insulation layer 322. As illustrated in FIG. 13, a portion of the discharge electrode 310 may be removed. That is, the discharge electrode 310 may be partially removed, and the discharge induction layer 330 may be formed in the removed region of the discharge electrode 310. However, although the discharge electrode 310 is partially removed, the entirely connected configuration of the discharge electrode 310 on the plane may be maintained to prevent electrical properties from being deteriorated. Although the internal electrode 200 is partially removed, the electrical properties may not be deteriorated.

Figure 11:
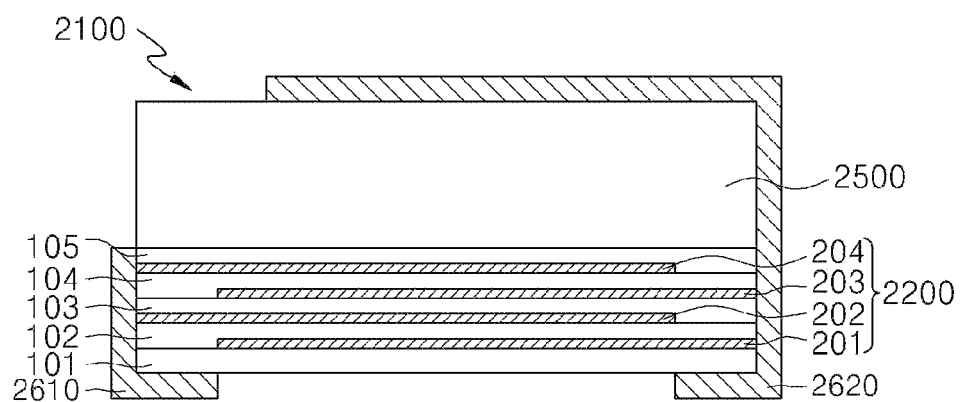

The electric shock prevention part in accordance with the exemplary embodiments includes the ESD protection part provided with the ESD protection layer including the ESD protection material or the void in the laminate. However, in the contactor in accordance with the exemplary embodiments, the electric shock prevention part may be provided in a varistor type. That is, the electric shock prevention part may be made of a material having varistor or diode properties without including a separate ESD protection layer. For this, at least a portion of the laminate 2100 may be made of a material having non-linear electrical properties in which current flows when a voltage greater than a breakdown voltage is applied and does not flow when a voltage less than the breakdown voltage is applied. That is, at least one of the plurality of insulation sheets 100 of the laminate 2100 may be formed by using at least one of Pr-based, Bi-based, and Si-based materials. For example, as illustrated in FIG. 11, the laminate 2100 may be formed by laminating the capacitor part 2200, in which the plurality of internal electrodes 200 (201 to 204) are provided, and the dummy layer 2500. Also, at least one of the plurality of insulation sheets 101 to 105 may be made of the material having the varistor or diode properties. Particularly, the third insulation sheet 103 between the second and third internal electrodes 202 and 203 may be made of the material having the varistor or diode properties. Here, the rest insulation sheets 101, 102, 104, and 105 may be made of the material described in accordance with an exemplary embodiment. Similarly, the third insulation sheet 101 may be made of the material having the varistor or diode properties. The dummy layer 2500 may be made of the material having the varistor or diode properties. Alternatively, the dummy layer 2500 may be made of the insulation material described in accordance with an exemplary embodiment. In the varistor type electric shock prevention part in accordance with another exemplary embodiment, the ESD voltage may be discharged through the overlapping area between two internal electrodes adjacent to each other, i.e., the second and third internal electrodes 202 and 203.

Figure 12:
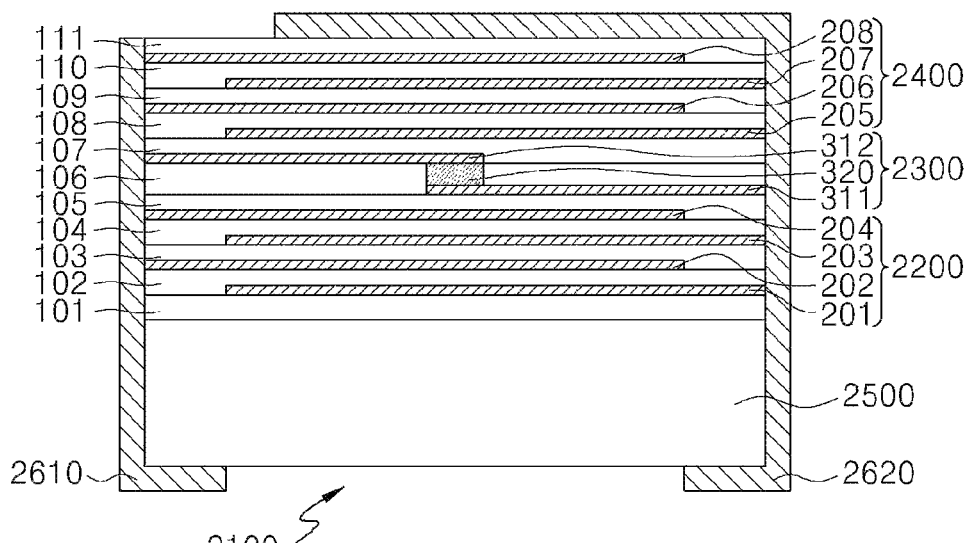

The case in which the dummy layer 2500 is disposed in the upper portion of the laminate 2100 has been described in the abovementioned exemplary embodiments. However, the dummy layer 2500 may be disposed in a lower portion of the laminate 2100. That is, as illustrated in FIG. 12, the plurality of insulation sheets 100 may be laminated on the dummy layer 2500, and at least one capacitor part 2200 and 2400 and at least one ESD protection part 2300 may be disposed in the plurality of insulation sheets 100. Here, the external electrodes 2610 and 2620 may be disposed on two side surfaces facing each other of the laminate 2100 to extend to the bottom surface of the laminate 2100 facing the internal circuit 20 and then be spaced a predetermined distance from each other. Also, the second external electrode 2620 may extend to the top surface of the laminate 2100, and the first external electrode 2160 may not be disposed on the top surface of the laminate 2100.

Also, in the abovementioned embodiments, the contact part 1000 may come into contact with the conductor 10, and the electric shock prevention part 2000 may come into contact with the internal circuit 20. However, as illustrated in FIG. 13, the contact part 1000 may come into contact with the internal circuit 20, and the electric shock prevention part 2000 may come into contact with the conductor 10. Here, at least a portion of the contact part 1000 may come into contact with the ground terminal of the internal circuit 20, and the internal circuit 20 coming into contact with the contact part 1000 may be connected to the ground terminal. Also, the electric shock prevention part 2000 may include the plurality of insulation sheets 100 and the dummy layer 2500 disposed on at least one area of the upper and lower portions of the plurality of insulation sheets 100. For example, as illustrated in FIG. 13, the first and second dummy layers 2510 and 2520 may be disposed on the upper and lower portions of the laminate 2100, and the plurality of insulation sheets 100 may be disposed between the first and second dummy layers 2510 and 2520. Alternatively, at least one capacitor part 2200 and 2400 and at least one ESD protection part 2300 may be disposed on the insulation sheet 100. Also, the first external electrode 2610 may be disposed on each of the side and bottom surfaces of the laminate 2100. Here, the first external electrode 2610 may be disposed on the side surface of the laminate 2100 up to a lower side of the second dummy layer 2510. That is, the first external electrode 2610 may be disposed up to the eleventh insulation sheet 111. Also, the second external electrode 2620 may be disposed on each of the side and bottom surfaces of the laminate 2100. Here, the second external electrode 2620 may be disposed on the side surface of the laminate 2100 from an upper side of the second dummy layer 2520. That is, the second external electrode 2620 may be disposed from the first insulation sheet 101. The first external electrode 2610 may be disposed on the bottom surface of the laminate 2100 to come into contact with the contact part 1000, and the second external electrode 2620 may be disposed on the top surface of the laminate 2100 to come into contact with the conductor 10.

The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

The invention claimed is:

1. A contactor disposed on a conductor coming into contact with a user of an electronic device and an internal circuit, the contactor comprising:
   a contact part and an electric shock prevention part, which are disposed to face each other, and, of which at least portions respectively come into contact with the conductor and the internal circuit,
   wherein the electric shock prevention part comprises a laminate in which a plurality of insulation sheets are vertically laminated between the internal circuit and the conductor and an external electrode disposed on a side surface of the laminate, and
   at least one portion of the external electrode extends to one surface of the laminate and is connected to a ground terminal or the conductor, and at least the other portion extends to the other surface of the laminate to come into contact with the contact part.

2. The contactor of claim 1, wherein the contact part is fixed to the conductor, and the electric shock prevention part is fixed to the internal circuit, or the contact part is fixed to the internal circuit, and the electric shock prevention part is fixed to the contact part.

3. The contactor of claim 2, wherein the contact part has conductivity and elasticity.

4. The contactor of claim 3, wherein the contact part comprises a protrusion in which at least a portion of the contact part protrudes from an area fixed to the conductor toward the electric shock prevention part.

5. The contactor of claim 3, wherein the contact part comprises an elastic body and a conductive layer surrounding the elastic body.

6. The contactor of claim 2, wherein the electric shock prevention part comprises at least one of a capacitor part and an ESD protection part, which are disposed in the laminate, and at least one dummy layer.

7. The contactor of claim 6, wherein the ESD protection part comprises at least two or more discharge electrodes vertically or horizontally spaced apart from each other and an ESD protection layer disposed between the discharge electrodes and comprising at least one of a porous insulation material, a conductive material, a mixture of the porous insulation material and the conductive material, and a void.

8. The contactor of claim 6, wherein the ESD protection part comprises a varistor or diode having a breakdown voltage that is greater than an electric shock voltage and less than an ESD voltage.

9. The contactor of claim 6, wherein the dummy layer is disposed on at least one of upper and lower portions of a device formation layer on which at least one of the capacitor part and the ESD protection part is disposed.

10. The contactor of claim 9, wherein the dummy layer has a thickness greater than at least one of a thickness of the ESD protection layer, a thickness between internal electrodes of the capacitor part, a thickness between the ESD protection layer and each of the internal electrodes, and a thickness of the lowermost insulation sheet.

* * * * *